(12) United States Patent
Lee et al.

(10) Patent No.: US 10,093,310 B2
(45) Date of Patent: Oct. 9, 2018

(54) DRIVER ASSISTANCE APPARATUS FOR VEHICLE AND VEHICLE HAVING THE SAME

(71) Applicant: LG ELECTRONICS INC., Seoul (KR)

(72) Inventors: Jeihun Lee, Seoul (KR); Jongwon Yoon, Seoul (KR); Jukyong Jin, Seoul (KR); Yeonchool Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/137,835

(22) Filed: Apr. 25, 2016

(65) Prior Publication Data

US 2017/0066439 A1 Mar. 9, 2017

(30) Foreign Application Priority Data

Sep. 3, 2015 (KR) .......................... 10-2015-0125005

(51) Int. Cl.
*B60W 30/085* (2012.01)
*B60W 10/18* (2012.01)
*B60W 10/22* (2006.01)
*B60W 30/095* (2012.01)
*B60G 17/016* (2006.01)
(Continued)

(52) U.S. Cl.
CPC ......... *B60W 30/085* (2013.01); *B60G 17/018* (2013.01); *B60G 17/0164* (2013.01); *B60G 17/0195* (2013.01); *B60W 10/18* (2013.01); *B60W 10/22* (2013.01); *B60W 30/095* (2013.01); *B60G 2500/30* (2013.01); *B60G 2800/222* (2013.01); *B60G 2800/914* (2013.01); *B60W 2030/082* (2013.01); *B60W 2400/00* (2013.01); *B60W 2420/42* (2013.01); *B60W 2710/18* (2013.01); *B60W 2710/22* (2013.01)

(58) Field of Classification Search
CPC .... B60W 30/085; B60W 10/18; B60W 10/22; B60W 30/095; B60W 2030/082; B60W 2400/00; B60W 2420/42; B60W 2710/18; B60W 2710/22; B60G 17/0164; B60G 17/018; B60G 17/0195; B60G 2500/30; B60G 2800/222; B60G 2800/914
USPC ............ 701/301, 37, 48; 340/435, 440, 557; 342/70, 118; 180/169, 217, 279, 65.1, 180/65.8
See application file for complete search history.

(56) References Cited

U.S. PATENT DOCUMENTS 5,577,569 A 11/1996 Nakashima
9,604,607 B2 * 3/2017 Hammoud ................ B60T 7/22
(Continued)

FOREIGN PATENT DOCUMENTS

DE 102004045092 A1 3/2006
JP 11-348523 A 12/1999
(Continued)

*Primary Examiner* — Marthe Y Marc-Coleman
(74) *Attorney, Agent, or Firm* — Birch, Stewart, Kolasch & Birch, LLP

(57) ABSTRACT

A driver assistance apparatus includes a camera for acquiring a vehicle front view image or a surroundings-of-vehicle image; and a processor for providing a height control signal for a suspension for adjusting an expected impacted portion according to collision between a driver's vehicle and an object detected in the vehicle front view image or the surroundings-of-vehicle image.

15 Claims, 28 Drawing Sheets

(51) Int. Cl.
*B60G 17/018* (2006.01)
*B60G 17/0195* (2006.01)
*B60W 30/08* (2012.01)

(56) References Cited

U.S. PATENT DOCUMENTS

| | | | |
|---|---|---|---|
| 2006/0213714 A1* | 9/2006 | Igawa | B60R 21/0134 180/274 |
| 2010/0006363 A1 | 1/2010 | Zagorski | |
| 2011/0155496 A1* | 6/2011 | Baumann | B60R 21/0134 180/282 |
| 2014/0195113 A1 | 7/2014 | Lu et al. | |
| 2017/0129298 A1* | 5/2017 | Lu | B60G 17/015 |

FOREIGN PATENT DOCUMENTS

| | | | | |
|---|---|---|---|---|
| JP | 2000-105898 | A | | 4/2000 |
| JP | 2005271622 | A | * | 10/2005 |
| JP | 2005-271622 | A | | 10/2006 |
| JP | 2007-62447 | A | | 3/2007 |
| JP | 2011-68205 | A | | 4/2011 |
| JP | 2014-121905 | A | | 7/2014 |
| JP | 2014121905 | A | * | 7/2014 |
| KR | 10-1998-020459 | A | | 6/1998 |
| KR | 10-2006-0015987 | A | | 2/2006 |
| KR | 10-2014-0106853 | A | | 9/2014 |
| KR | 10-2015-0074753 | A | | 7/2015 |

* cited by examiner

FIG. 1
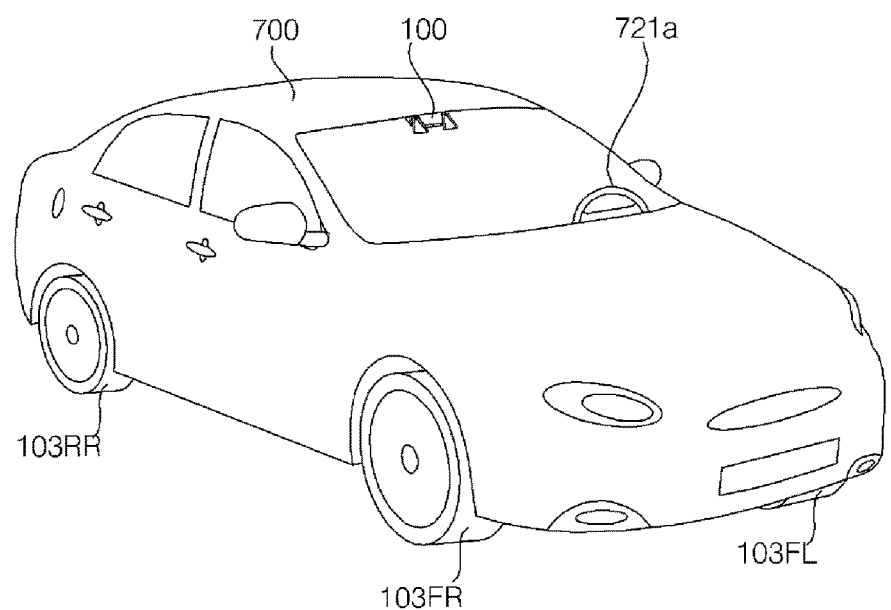
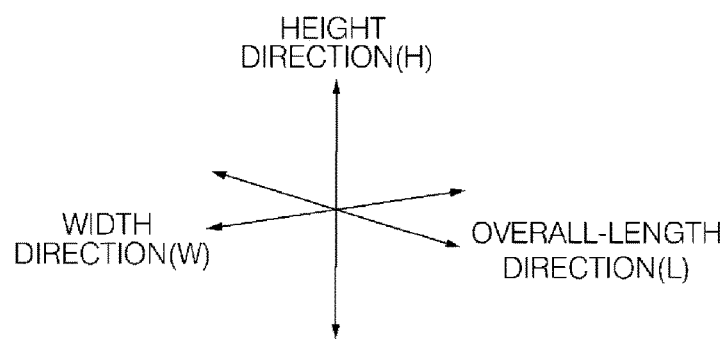

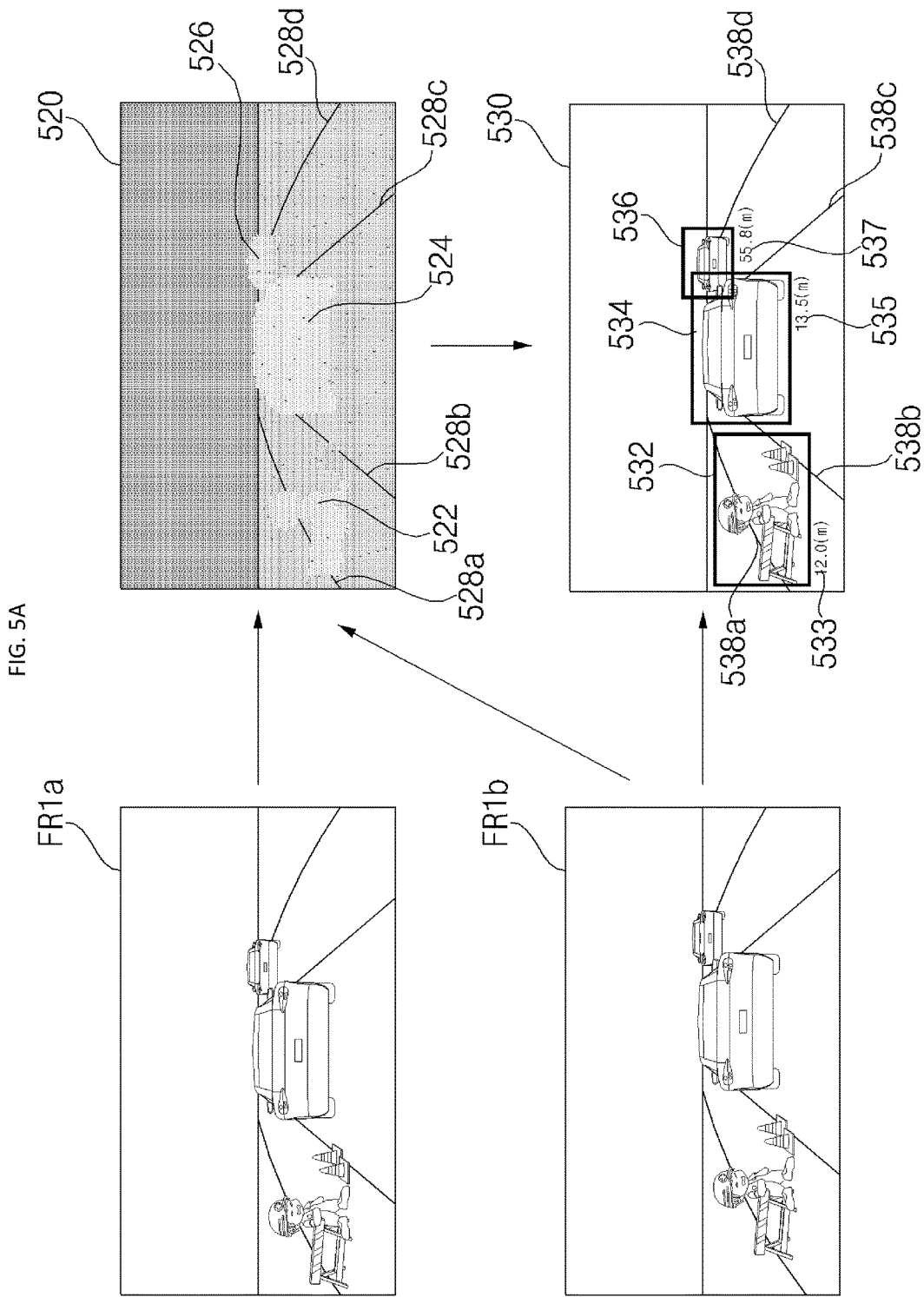

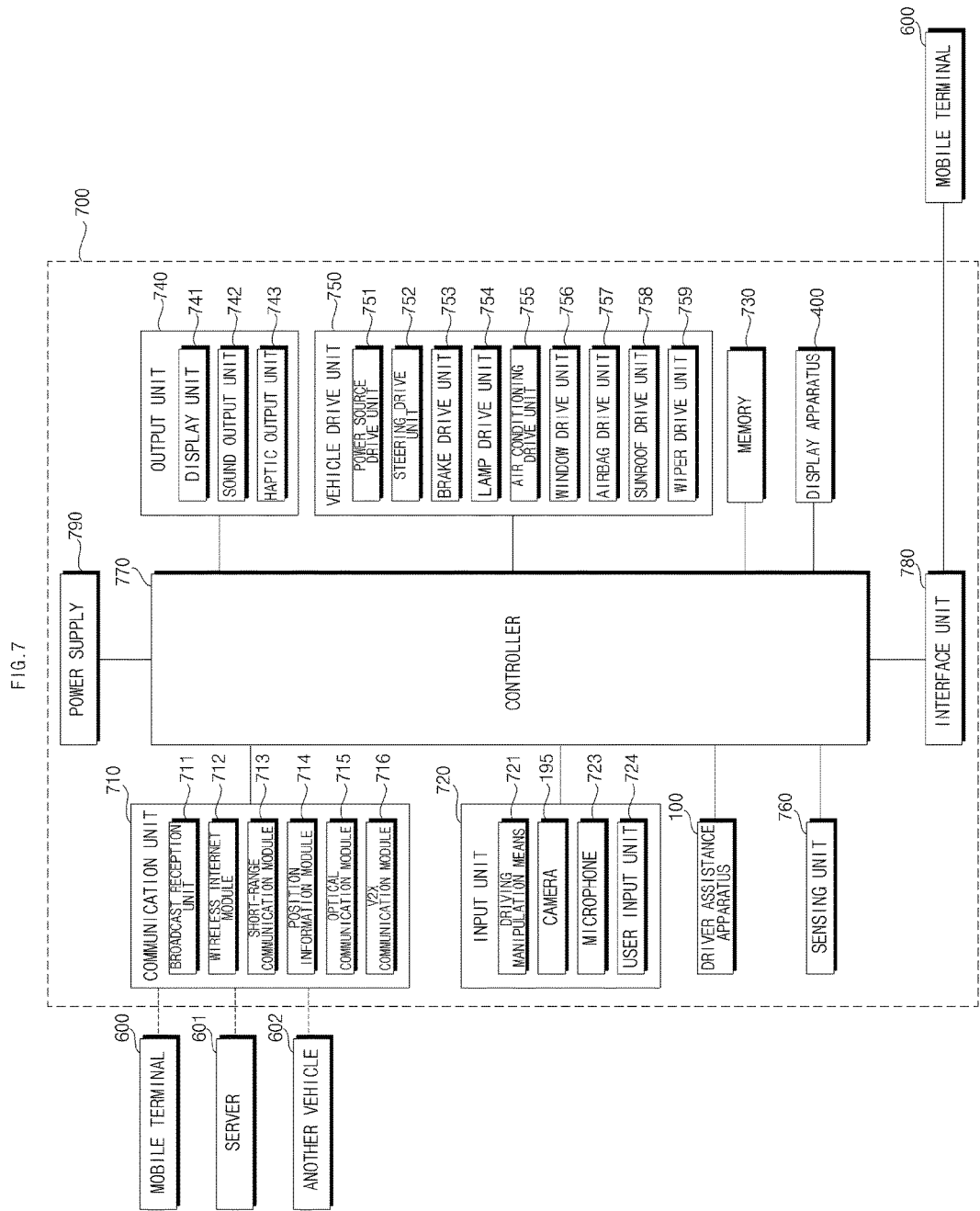

DRIVER ASSISTANCE APPARATUS FOR VEHICLE AND VEHICLE HAVING THE SAME

CROSS-REFERENCE TO RELATED APPLICATION

This application claims the priority benefit of Korean Patent Application No. 10-2015-0125005, filed on Sep. 3, 2015, in the Korean Intellectual Property Office, the entire disclosure of which is incorporated herein by reference.

BACKGROUND OF THE INVENTION

1. Field of the Invention

The present invention relates to a driver assistance apparatus for vehicles and a vehicle including the same.

2. Description of the Related Art

A vehicle is an apparatus that is moved in a desired direction by a user riding therein. A typical example of the vehicle is an automobile.

Vehicles have been increasingly equipped with various sensors and electronic devices to provide user convenience. In particular, various apparatuses for driver convenience are under development.

Recently, attention is increasingly drawn to autonomous vehicles, and research on sensors to be installed in the autonomous vehicles is underway. Sensors installed in autonomous vehicles include a camera, an infrared sensor, a radar, a global positioning system (GPS), a lidar and a gyroscope. Thereamong, the camera plays an important role as a sensor operating like the eyes of a person.

When the vehicle is suddenly braked, a nose dive phenomenon occurs due to inertia. If the vehicle collides with a preceding vehicle during the nose dive, the vehicle is subjected to shock as it burrows into a space below the rear bumper of the preceding vehicle. In this instance, the radiator grille, front fender, headlamps and front end of the hood of the vehicle, which have low rigidities, may be significantly damaged since they directly hit the back of the preceding vehicle.

Accordingly, there is a need for development of a technology for properly controlling the suspension to prevent occurrence of the nose dive.

SUMMARY OF THE INVENTION

Therefore, the present invention has been made in view of the above problems, and it is an object of the present invention to provide a driver assistance apparatus which controls the height of a suspension to adjust a part of the driver's vehicle which is expected to be subjected to shock according to collision with an object detected in an image.

Objects of the present invention are not limited to the aforementioned object, and other objects of the present invention which are not mentioned above will become apparent to those having ordinary skill in the art upon examination of the following description.

In accordance with an aspect of the present invention, the above and other objects can be accomplished by the provision of a driver assistance apparatus including a camera for acquiring a vehicle front view image or a surroundings-of-vehicle image and a processor for providing a height control signal for a suspension for adjusting an expected impacted portion of a driver's vehicle according to collision between the driver's vehicle and an object detected in the vehicle front view image or the surroundings-of-vehicle image.

In accordance with another aspect of the present invention, the above and other objects can be accomplished by the provision of a vehicle including the driver assistance apparatus.

Other details of embodiments are included in the following detailed description and accompanying drawings.

BRIEF DESCRIPTION OF THE DRAWINGS

The above and other objects, features and other advantages of the present invention will be more clearly understood from the following detailed description taken in conjunction with the accompanying drawings, in which:

FIG. 1 shows the exterior of a vehicle according to an embodiment of the present invention;

FIGS. 5A and 5B illustrate operation of the processor of FIGS. 4A to 4C based on stereo images acquired in first and second frame intervals, respectively;

FIG. 7 is an exemplary internal block diagram of the vehicle of FIG. 1;

DETAILED DESCRIPTION OF THE PREFERRED EMBODIMENTS

Figure 2A:
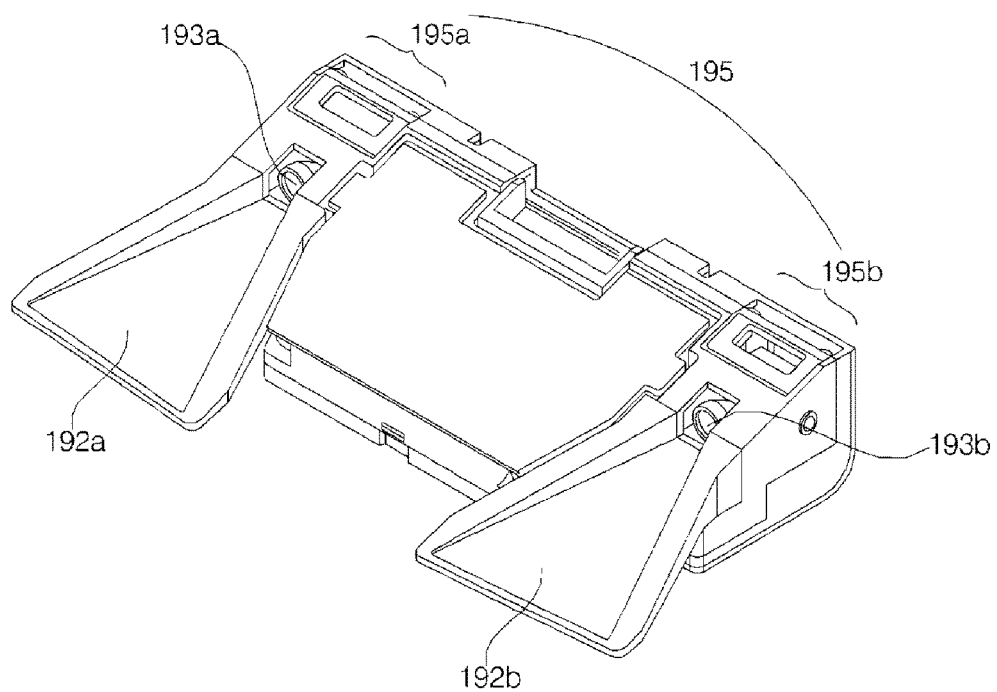
FIGS. 2A to 2C are views illustrating a driver assistance apparatus included in the vehicle of FIG. 1 according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest unique meanings or functions. In describing embodiments disclosed in this specification, a detailed description of relevant well-known technologies may not be given in order not to obscure the subject matter of the present invention. In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

Stating that one constituent is "connected" or "linked" to another should be understood as meaning that the one constituent may be directly connected or linked to another constituent or another constituent may be interposed between the constituents. Alternatively, stating that one constituent is "directly connected" or "directly linked" to another should be understood as meaning that no other constituent is interposed between the constituents.

As used herein, the singular forms "a", "an", and "the" are intended to include the plural forms as well, unless context clearly indicates otherwise.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

The term "vehicle" employed in this specification may include an automobile and a motorcycle. Hereinafter, description will be given mainly focusing on an automobile.

The vehicle described in this specification may include a vehicle equipped with an internal combustion engine as a power source, a hybrid vehicle equipped with both an engine and an electric motor as a power source, and an electric vehicle equipped with an electric motor as a power source.

In the description below, the left side of the vehicle means the left side with respect to the travel direction of the vehicle and the right side of the vehicle means the right side with respect to the travel direction of the vehicle.

If not stated otherwise, description will be given focusing on a left hand drive (LHD) vehicle. Of course, an RHD vehicle is also within the scope of the present invention.

FIG. 1 shows the exterior of a vehicle according to an embodiment of the present invention.

Referring to FIG. 1, a vehicle 700 may include wheels 103FR, 103FL, 103RL, . . . rotated by a power source, a steering input means 721a for adjusting the travel direction of the vehicle 700, and a driver assistance system 100 provided in the vehicle 700.

The driver assistance apparatus 100 may be provided with at least one camera, and images acquired by the at least one camera may be signal-processed in a processor.

In the illustrated example, the driver assistance apparatus 100 is provided with two cameras.

The overall length refers to the length of the vehicle 700 from the front to back of the vehicle, the width refers to the width of the vehicle 700, and the height refers to the distance from the bottom of a wheel to the roof of the vehicle. In the description below, the overall-length direction L may indicate a direction in which measurement of the overall length of the vehicle 700 is performed, the width direction W may indicate a direction in which measurement of the width of the vehicle 700 is performed, and the height direction H may indicate a direction in which measurement of the height of the vehicle 700 is performed.

In the present invention, the vehicle 700 may be an autonomous vehicle.

In the description below, the vehicle 700 will be referred to as a driver's vehicle 700 in order to distinguish the vehicle 700 from other vehicles.

Figure 2B:
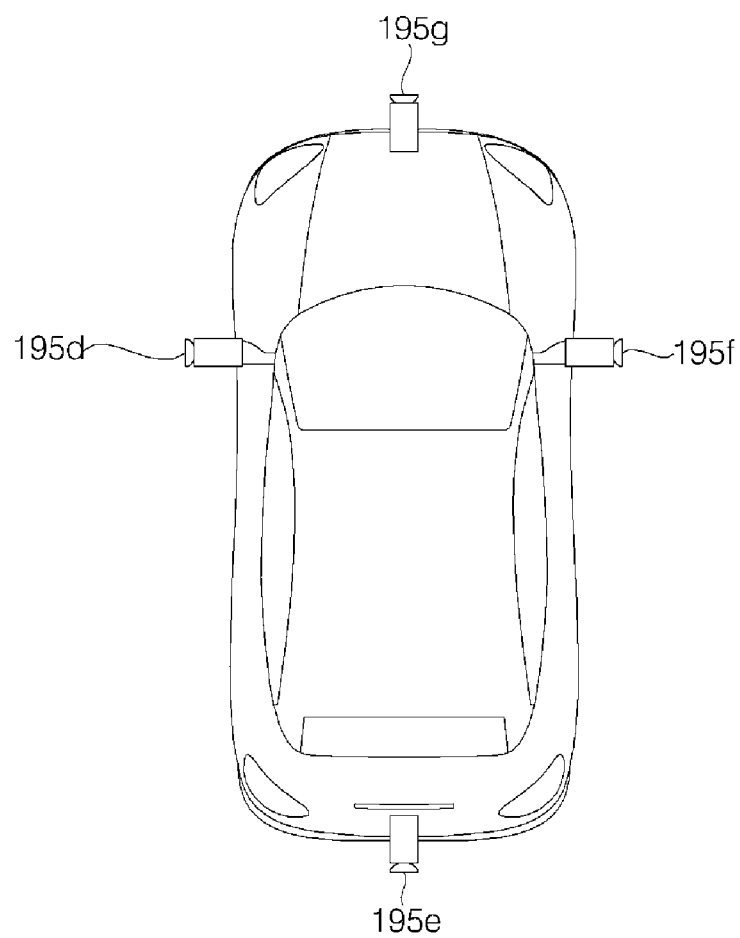
Figure 2C:
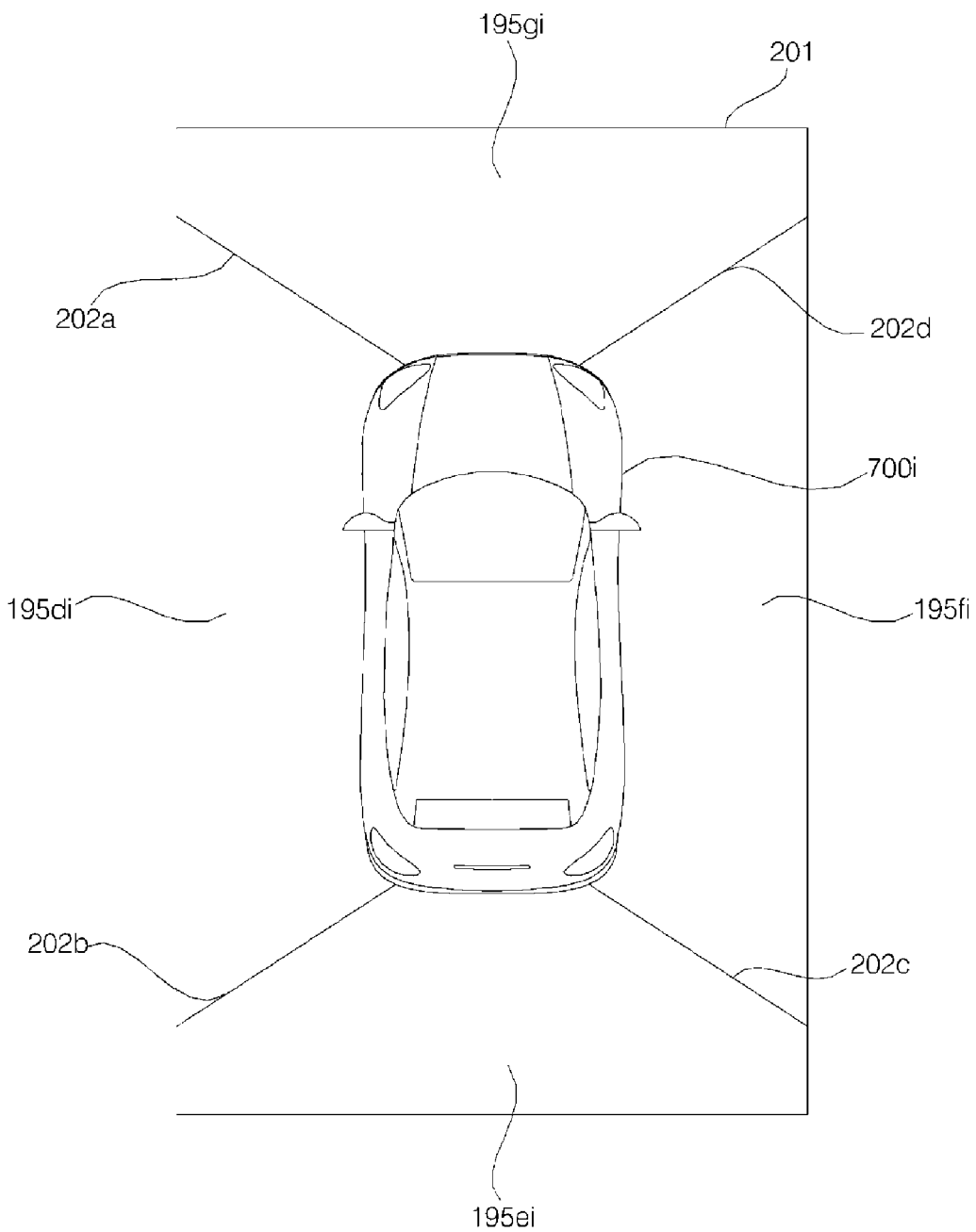

FIGS. 2A to 2C illustrate a driver assistance apparatus included in the vehicle of FIG. 1 according to an embodiment of the present invention.

Hereinafter, description will be given of a driver assistance apparatus including cameras 195a and 195b for acquiring images of the front view of the vehicle with reference to FIG. 2A.

While the driver assistance apparatus 100 is illustrated as including two cameras in FIG. 2A, it is apparent that the number of cameras is not limited thereto.

Referring to FIG. 2A, the driver assistance apparatus 100 may include a first camera 195a provided with a first lens 193a and a second camera 195b provided with a second lens 193b. In this instance, the camera 195 may be called a stereo camera.

The driver assistance apparatus 100 may include a first light shield 192a and a second light shield 192b, which are intended to block light incident on the first lens 193a and the second lens 193b, respectively.

The driver assistance apparatus 100 shown in the figure may be detachably attached to the ceiling or windshield of the vehicle 700.

The driver assistance apparatus 100 may acquire stereo images of the front view of the vehicle from the first and second cameras 195a and 195b, perform disparity detection based on the stereo images, perform object detection in at least one stereo image based on the disparity information, and continuously track movement of an object after object detection.

Hereinafter, description will be given of a driver assistance apparatus including cameras 195d, 195e, 195f and 195g for acquiring images of surroundings of the vehicle with reference to FIGS. 2B and 2C.

While FIGS. 2B and 2C illustrate the driver assistance apparatus 100 as including four cameras, it is apparent that the number of cameras is not limited thereto.

Referring to FIGS. 2A and 2B, the driver assistance apparatus 100 may include a plurality of cameras 195d, 195e, 195f and 195g. In this instance, the camera 195 may be called an around view camera.

The cameras 195d, 195e, 195f and 195g may be disposed at the left, back, right and front of the vehicle, respectively.

The left camera 195d may be disposed in a case surrounding the left side-view mirror. Alternatively, the left camera 195d may be disposed at the exterior of the case surrounding the left side-view mirror. Alternatively, the left camera 195d may be disposed in one outer area of the left front door, left rear door or left fender.

The right camera 195f may be disposed in a case surrounding the right side-view mirror. Alternatively, the right camera 195f may be disposed at the exterior of the case surrounding the right side-view mirror. Alternatively, the right camera 195f may be disposed at one outer area of the right front door, right rear door or right fender.

The rear camera 195e may be disposed near the rear license plate or trunk switch.

The front camera 195g may be disposed near the emblem or radiator grille.

Images captured by the plurality of cameras 195d, 195e, 195f and 195g may be delivered to the processor 170, and the processor 170 may synthesize the images to create an image of the surroundings of the vehicle.

FIG. 2C shows an exemplary image of the surroundings of the vehicle. A surroundings-of-vehicle image 201 may include a first image area 195di of an image captured by the left camera 195d, a second image area 195ei of an image captured by the rear camera 195e, the third image area 1956 of an image captured by the right camera 195f, and the fourth image area 195gi of an image captured by the front camera 195g.

The surroundings-of-vehicle image 201 may be displayed as a top view image or bird's eye view image.

When an around view image is generated from the plurality of cameras, boundary parts may be produced among the respective image areas. The boundary parts may be processed through image blending to look natural when they are displayed.

Boundary lines 202a, 202b, 202c, and 202d may be displayed on the respective boundaries of a plurality of images.

The surroundings-of-vehicle image 201 may include a vehicle image 700i. Herein, the vehicle image 700i may be generated by the processor 170.

The surroundings-of-vehicle image 201 may be displayed through the display unit 741 of the vehicle or a display unit 180 of the driver assistance apparatus.

Figure 3A:
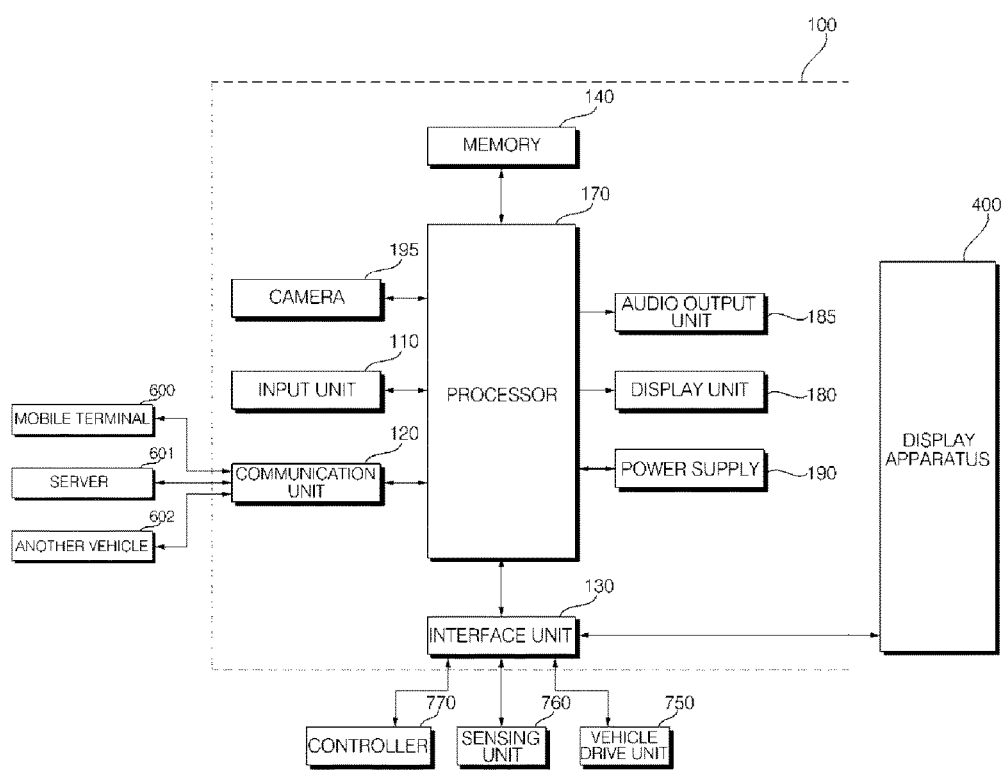
FIGS. 3A to 3C are exemplary internal block diagrams of a driver assistance apparatus according to various embodiments of the present invention.
Figure 3B:
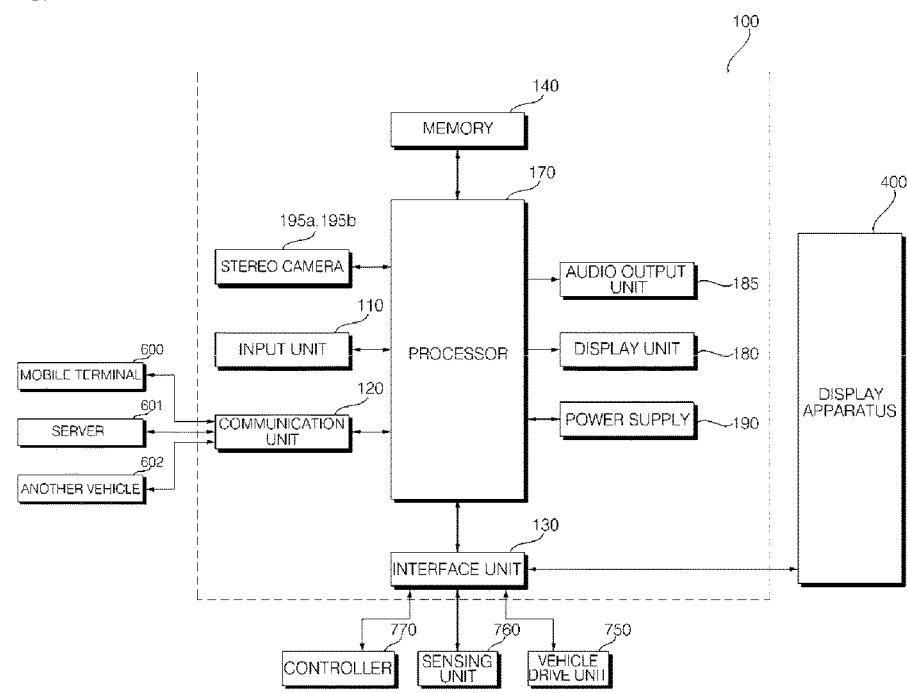
Figure 3C:
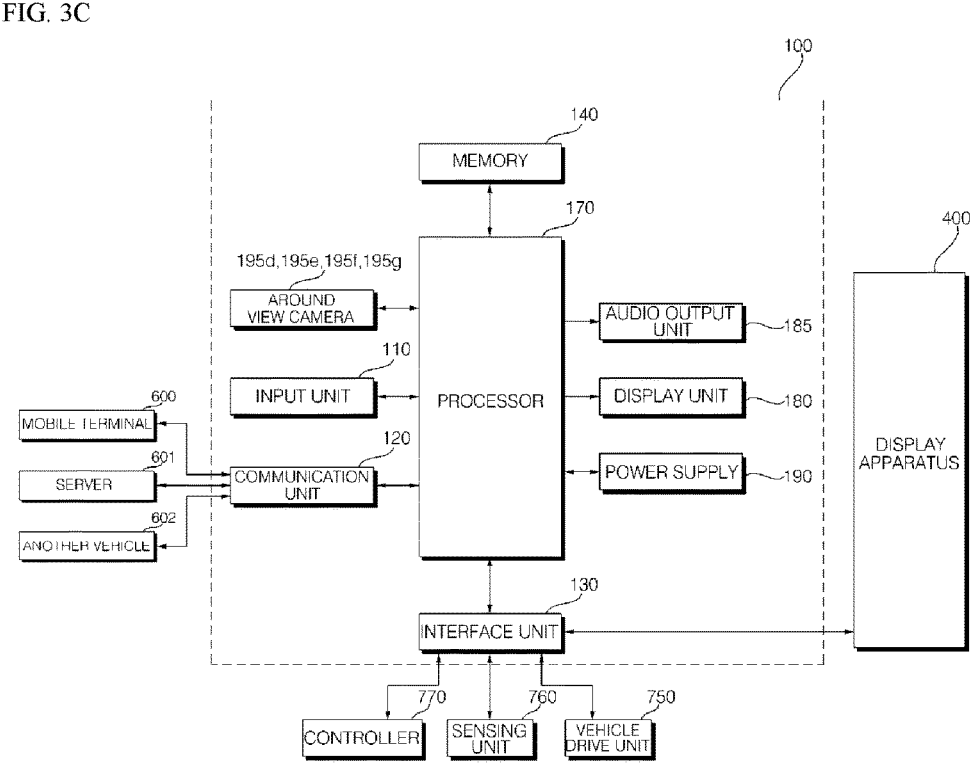

FIGS. 3A to 3C are exemplary internal bock diagrams of a driver assistance apparatus according to various embodiments of the present invention.

The driver assistance apparatus 100 of FIGS. 3A and 3B may generate vehicle-related information by signal-processing an image received from the camera 195 based on computer vision. Herein, the vehicle-related information may include vehicle control information for direct control of the vehicle or vehicle driving assistance information for assisting the driver in driving the vehicle.

Herein, the camera 195 may be a mono camera. Alternatively, the camera 195 may include around view cameras 195d, 195e, 195f and 195g for capturing images of surroundings of the vehicle.

FIG. 3A is an internal block diagram of the driver assistance apparatus 100 according to an embodiment of the present invention.

Referring to FIG. 3A, the driver assistance apparatus 100 may include an input unit 110, a communication unit 120, an interface unit 130, a memory 140, a processor 170, a power supply 190, a camera 195, a display unit 180 and an audio output unit 185.

The input unit 110 may be equipped with a plurality of buttons or a touchscreen attached to the driver assistance apparatus 100, in particular, the camera 195. The driver assistance apparatus 100 may be turned on and operated through the plurality of buttons or the touchscreen. Various input operations may also be performed through the buttons or touchscreen.

The communication unit 120 may wirelessly exchange data with a mobile terminal 600, a server 601 or another vehicle 602. In particular, the communication unit 120 may wirelessly exchange data with a mobile terminal of the vehicle driver. Applicable wireless data communication schemes may include Bluetooth, Wi-Fi Direct, Wi-Fi, APiX, and NFC.

The communication unit 120 may receive weather information and traffic situation information (e.g., TPEG (Transport Protocol Expert Group)) from the mobile terminal 600 or the server 601. The driver assistance apparatus 100 may transmit recognized real-time information to the mobile terminal 600 or the server 601.

When a user enters the vehicle, the mobile terminal 600 of the user may be paired with the driver assistance apparatus 100 automatically or by execution of an application by the user.

The communication unit 120 may receive change-of-traffic light information from the external server 601. Herein, the external server 601 may be a server positioned at a traffic control center that controls traffic.

The interface unit 130 may receive vehicle-related data or transmit a signal processed or generated by the processor 170. To this end, the interface unit 130 may perform data communication with the controller 770, a display apparatus 400 for vehicles, a sensing unit 760 and a vehicle drive unit 750, which are included in the vehicle, through wired or wireless communication.

The interface unit 130 may receive navigation information through communication with the controller 770, the display apparatus 400 or a separate navigation apparatus. Herein, the navigation information may include destination information, route information according to the destination, map information, or current vehicle location information, wherein the map information and the current vehicle location information are related to traveling of the vehicle.

The interface unit 280 may receive sensor information from the controller 770 or the sensing unit 760.

Herein, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicular lamp information, vehicle interior temperature information, vehicle interior humidity information, and information about whether or not it rains.

Such sensor information may be acquired from a heading sensor, a yaw sensor, a gyro sensor, a position module, a vehicle drive/reverse drive sensor, a wheel sensor, a vehicle speed sensor, a vehicle body tilt sensor, a battery sensor, a fuel sensor, a tire sensor, a steering sensor based on turning of the steering wheel, a vehicle interior temperature sensor, a vehicle interior humidity sensor, and a rain sensor. The position module may include a GPS module for receiving GPS information.

Among the pieces of sensor information, the vehicle direction information, vehicle location information, vehicle orientation information, vehicle speed information and vehicle inclination information, which are related to traveling of the vehicle, may be called vehicle travel information.

The interface unit 130 may provide a signal to the controller 770 or the vehicle drive unit 750. Herein, the signal may be a control signal. For example, the processor 170 may provide a steering control signal to the controller 770 or a steering drive unit 752 via the interface unit 130.

The memory 140 may store various kinds of data for overall operation of the driver assistance apparatus 100 including a program for processing or controlling operation of the processor 170.

The memory 140 may store data for identifying an object. For example, if a predetermined object is detected in an image acquired through the camera 195, the memory 140 may store data for identifying the object according to a predetermined algorithm.

The memory 140 may store traffic information data. For example, if predetermined traffic information is detected in an image acquired through the camera 195, the memory 140 may store data for identifying the traffic information according to a predetermined algorithm.

When implemented through hardware, the memory 140 may include various storage devices such as a ROM, RAM, EPROM, flash drive, and hard drive.

The processor 170 may control overall operation of each unit in the driver assistance apparatus 100.

The processor 170 may process a vehicle front view image or a surroundings-of-vehicle image acquired by the camera 195. In particular, the processor 170 performs signal processing based on computer vision. Thereby, the processor 170 may acquire an image of the front view or surroundings of the vehicle from the camera 195, and may detect and track an object based on the image. In particular, in detecting an object, the processor 170 may perform lane detection (LD), vehicle detection (VD), pedestrian detection (PD), brightspot detection (BD), traffic sign recognition (TSR), and road surface detection.

The processor 170 may detect information in a vehicle front view image or surroundings-of-vehicle image acquired by the camera 195.

The information may be information about the travel situation of the vehicle. For example, the information may include information on the road on which the vehicle travels, traffic law information, nearby vehicle information, vehicle or pedestrian traffic light information, construction information, traffic situation information, parking lot information, and lane information.

The processor 170 may identify the detected information by comparing the detected information with information stored in the memory 140.

The processor 170 may receive weather information and traffic situation information (e.g., TPEG (Transport Protocol Expert Group) information) through the communication unit 120.

The processor 170 may verify the traffic situation information about the surroundings of the vehicle that is recognized by the driver assistance apparatus 100 based on images.

The processor 170 may receive, for example, navigation information from the display apparatus 400 or a separate navigation apparatus via the interface unit 130.

The processor 170 may receive sensor information from the controller 770 or the sensing unit 760 through the interface unit 130. Herein, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicular lamp information, interior temperature information, interior humidity information and steering wheel rotation information.

The processor 170 may receive an image acquired by the camera 195. Herein, the image may be a vehicle front view image or surroundings-of-vehicle image. The camera 195 may include a mono camera, stereo cameras 195a and 195b or around view cameras 195d, 195e, 195f and 195g.

The processor 170 may detect an object. The processor 170 may verify and track the detected object. Herein, the object may be a preceding vehicle, a following vehicle, or another vehicle positioned on one side of the vehicle.

The processor 170 may detect the position of a bumper attached to another vehicle in the image. For example, the processor 170 may detect the position of a rear bumper of a preceding vehicle in an image. For example, the processor 170 may detect the position of a front bumper of a following vehicle in an image.

According to an embodiment, the processor 170 may estimate the position of a bumper of another vehicle based on the height and type of the vehicle.

The processor 170 may predict collision between the driver's vehicle 700 and an object detected in an image.

The processor 170 may calculate a distance to the detected object. For example, the processor 170 may calculate the distance to the object based on variation of the recognized size of the object over time. Alternatively, the processor 170 may calculate the distance to the object based on disparity. Alternatively, the processor 170 may calculate the distance to the object based on Time of Flight (TOF).

The processor 170 may calculate a relative speed of the object based on the detected distance. For example, the processor 170 may calculate the relative speed of the object by calculating the change in distance of the object per unit time.

The processor 170 may detect the speed of the object based on the travel speed of the driver's vehicle 700 and the relative speed.

The processor 170 may predict collision with the object based on the distance and the relative speed of the object. For example, the processor 170 may compute the time to collision (TTC) with the object. If the TTC is less than a reference value, the processor 170 may predict occurrence of collision with the object.

In this specification, collision may cover the concept of rear-end collision.

The processor 170 may provide a suspension height control signal for adjusting an expected impacted portion of the driver's vehicle according to the collision.

By providing the suspension height control signal for adjusting the expected impacted portion, the processor 170 may minimize damage caused by the shock.

The suspension height control signal may be provided to a suspension drive unit 759. The suspension drive unit 759 may control the suspension apparatus according to the control signal.

When collision with an object is predicted, the processor 170 may provide a suspension height control signal such that shock from the object is applied to the collision sensor for inflation of an airbag. For example, when collision with an object is predicted, the processor 170 may provide a suspension height control signal such that the collision sensor for inflating the airbag collides with the object. In this instance, the processor 170 may provide a steering control signal such that the collision sensor for inflating the airbag collides with the object. The steering control signal may be provided to a steering drive unit 753.

The processor 170 may predict collision with a preceding vehicle. For example, the processor 170 may predict collision with a preceding vehicle based on the distance and relative speed of the preceding vehicle. For example, the processor 170 may calculate the time to collision (TTC) with the preceding vehicle. If the TTC is less than a reference value, the processor 170 may predict occurrence of collision.

If collision with the preceding vehicle is predicted, the processor 170 may provide a height control signal for a front wheel suspension.

For example, when the vehicle is suddenly braked with collision with the preceding vehicle predicted, the processor 170 may provide a control signal for raising the front wheel suspensions. In this instance, the processor 170 may provide a control signal for raising the suspensions of the front wheels such that the rear bumper of the preceding vehicle collides with the front bumper of the driver's vehicle 700.

When the brake is suddenly applied, nose dive occurs. In this instance, the vehicle 700 may be subjected to shock as the front part of the vehicle 700 burrows into the space below the rear bumper of the preceding vehicle. If the driver assistance apparatus 100 operates, nose dive may be addressed and thus corresponding damage may be prevented.

The height control signal for the front wheel suspension may be provided to the suspension drive unit 759. The suspension drive unit 759 may control the suspension apparatus according to the provided control signal.

The processor 170 may predict collision with a following vehicle. For example, the processor 170 may predict collision with the following vehicle based on the distance and relative speed of the following vehicle. For example, the processor 170 may calculate the time to collision (TTC) with the following vehicle. If the TTC is less than or equal to a reference value, the processor 170 may predict occurrence of collision.

If collision with the following vehicle is predicted, the processor 170 may provide a height control signal for the rear wheel suspension.

For example, when the vehicle is suddenly braked with collision with the following vehicle predicted, the processor 170 may provide a control signal for lowering the suspensions of the rear wheels. In this instance, the processor 170 may provide a control signal for lowering the suspensions of the rear wheels such that the front bumper of the following vehicle collides with the rear bumper of the driver's vehicle 700.

When the brake is suddenly applied, nose dive occurs. In this instance, shock may be applied to the driver's vehicle 700 as the following vehicle burrows into the space below the rear bumper of the driver's vehicle 700 with the rear part of the driver's vehicle lifted. In a certain case, the driver's vehicle 700 may flip over. If the driver assistance apparatus 100 operates, nose dive may be addressed and corresponding damage may be prevented.

The rear wheel suspension height control signal may be provided to the suspension drive unit 759. The suspension drive unit 759 may control the suspension apparatus according to the provided control signal.

After collision with the following vehicle occurs, the processor 170 may predict collision with the preceding vehicle. For example, the processor 170 may predict collision with a preceding vehicle based on the distance and relative speed of the preceding vehicle. For example, the processor 170 may calculate the time to collision (TTC) with the preceding vehicle. If the TTC is less than a reference value, the processor 170 may predict occurrence of collision.

If collision with a preceding vehicle is expected, the processor 170 may provide a front wheel suspension height control signal.

For example, when collision with the preceding vehicle is predicted, the processor 170 may provide a control signal for lowering the suspension of the front wheels. In this instance, the processor 170 may provide a control signal for lowering the suspension of the front wheels such that the rear bumper of the preceding vehicle collides with the front bumper of the driver's vehicle 700.

After collision with the following vehicle occurs, a nose up phenomenon may occur due to sudden braking. In this instance, shock may be applied to the driver's vehicle 700 as the tail part of the preceding vehicle comes into the space below the driver's vehicle 700. Alternatively, the driver's vehicle 700 may flip over. At this time, the driver assistance apparatus 100 may operate, thereby preventing the nose up phenomenon and corresponding damage.

The front wheel suspension height control signal may be provided to the suspension drive unit 759. The suspension drive unit 759 may control the suspension apparatus according to the provided control signal.

After collision with the following vehicle occurs, the processor 170 may provide a control signal for performing braking. The control signal for performing braking may be provided to a brake drive unit 753. The brake drive unit 753 may control the brake apparatus according to the provided control signal. In this instance, the driver assistance apparatus 100 may prevent collision with a preceding vehicle from occurring after collision with a following vehicle occurs.

For example, if a preceding vehicle is not detected, the processor 170 may provide a control signal for performing braking such that the driver's vehicle 700 moves at a speed lower than or equal to a predetermined speed.

For example, if a preceding vehicle is not detected within a predetermined distance, the processor 170 may provide a control signal for performing full-braking.

The processor 170 may predict collision with another vehicle approaching from the left side or the right side. Herein, the vehicle approaching from the left side or the right side may be another vehicle traveling toward the left side or the right side of the driver's vehicle 700. The processor 170 may predict collision with another vehicle based on the distance and relative speed of the vehicle approaching from the left side or the right side. For example, the processor 170 may calculate the TTC with a vehicle approaching from the left side or the right side. If the TTC is less than or equal to a reference value, the processor 170 may predict occurrence of collision.

If collision with another vehicle approaching from the left side or the right side is predicted, the processor 170 may provide a height control signal for suspensions of the left wheels or the right wheels.

The processor 170 may detect the height of another vehicle approaching from the left side or the right side in a received image. The processor 170 may provide a left wheel or right wheel suspension height control signal in response to the height of the detected vehicle. In this instance, the processor 170 may provide a left wheel or right wheel suspension height control signal such that the vehicle approaching from the left side or the right side collides with impact beams disposed on the doors of the driver's vehicle 700.

When collision with another vehicle approaching from the left side or the right side is predicted as above, collision with the impact beam may be induced to enhance passenger safety.

The left wheel or right wheel suspension height control signal may be provided to the suspension drive unit 759. The suspension drive unit 759 may control the suspension apparatus according to the provided control signal.

After collision with another vehicle approaching from the left side or the right side occurs, the processor 170 may determine, through the received image, whether overturn of the driver's vehicle 700 is sensed. The processor 170 may determine overturn of the driver's vehicle 700 based on whether an object rotates to the left or right in the image. Herein, the expression "to the left or right" may indicate the width direction W.

For example, if rotation of the predetermined object to the left or right beyond a reference value is sensed, the processor 170 may determine that the driver's vehicle 700 flips over.

If overturning of the driver's vehicle 700 is sensed after collision with another vehicle approaching from the left side or the right side occurs, the processor 170 may provide a control signal for raising the suspension of the wheels on the opposite side of the impacted portion.

The processor 170 may detect a curve in the front view image of the vehicle. The processor 170 may control the height of the left or right wheel suspensions in accordance with the detected curve.

The processor 170 may receive travel speed information about the vehicle 700 from the sensing unit 760 through the interface unit 130. The processor 170 may provide a left or right wheel suspension height control signal in response to the curvature of the detected curve and the entrance speed on the curve.

The processor 170 may perform communication with a power source drive unit 751 through the interface unit 130. When collision with the detected object is predicted, the processor 170 may provide a control signal to the power source drive unit 751 such that power is not transferred to the driver's vehicle 700.

For example, if the vehicle 700 is an internal combustion engine vehicle, a control signal for closing the throttle valve may be provided to the throttle body to interrupt the supply of fuel.

For example, if the vehicle 700 is an electric vehicle, a control signal may be provided to a motor controller for controlling the motor such that the motor is not driven.

By interrupting power when collision with an object is predicted, a secondary accident such as an explosion may be prevented.

The processor 170 may detect a road surface in a front view image of the vehicle or a surroundings-of-vehicle image. The processor 170 may generate road surface condition information by analyzing the detected road surface. The processor 170 may provide a suspension height control signal based on the road surface condition information.

The processor 170 may receive trunk opening information from the controller 770 or the sensing unit 760 through the interface unit 130.

For example, when an input for opening the trunk is received from the user through a user input unit 174, the processor 170 may receive the input from the user input unit 724 or the controller 770 via the interface unit 130.

For example, if the sensing unit 760 includes a trunk opening sensor, the processor 170 may receive the trunk opening information from the sensing unit 760.

When the trunk is opened, the processor 170 may provide a control signal for lowering the suspension of the rear wheels.

As the suspension of the rear wheels is lowered when the trunk is opened, the user can easily take objects out of the trunk.

The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The processor 170 may be controlled by the controller 770.

The display unit 180 may display various kinds of information processed by the processor 170. The display unit 180 may display an image related to operation of the driver assistance apparatus 100. To display such image, the display unit 180 may include a cluster or HUD on the inner front of the vehicle. If the display unit 180 is an HUD, the unit may include a projection module for projecting an image onto the windshield of the vehicle 700.

The audio output unit 185 may output sound based on an audio signal processed by the processor 170. Therefore, the audio output unit 185 may include at least one speaker.

An audio input unit may receive a user's voice. Therefore, the unit may include a microphone. The received voice may be converted into an electrical signal and delivered to the processor 170.

The power supply 190 may be controlled by the processor 170 to supply electric power necessary for operation of respective constituents. In particular, the power supply 190 may receive power from, for example, a battery in the vehicle.

The camera 195 acquires a vehicle front view image or a surroundings-of-vehicle image. The camera 195 may be a mono camera or stereo cameras 195a and 195b for capturing the vehicle front view image. Alternatively, the camera 195 may be around view cameras 195d, 195e, 195f and 195g for capturing the surroundings-of-vehicle image.

The camera 195 may include an interior camera. The interior camera may capture images of the interior of the vehicle 700. Preferably, the interior camera is disposed on the cockpit module.

The interior camera may acquire an image of passengers. By acquiring the image of the passengers in the vehicle 700, the interior camera may detect the number of passengers.

The camera 195 may include an image sensor (e.g., CMOS or CCD) and an image processing module.

The camera 195 may process a still image or a moving image obtained by the image sensor. The image processing module may process the still image or the moving image acquired through the image sensor. According to an embodiment, the image processing module may be configured separately from the processor 170 or integrated with the processor 170.

FIG. 3B is an internal block diagram of the driver assistance apparatus 100 according to another embodiment of the present invention.

Referring to FIG. 3B, the driver assistance apparatus 100 of FIG. 3B differs from the driver assistance apparatus 100 of FIG. 3A in that the driver assistance apparatus 100 of FIG. 3B includes stereo cameras 195a and 195b. Hereinafter, description will be given focusing on this difference.

The driver assistance apparatus 100 may include first and second cameras 195a and 195b. Herein, the first and second cameras 195a and 195b may be referred to as stereo cameras.

The stereo cameras 195a and 195b may be detachably formed on the ceiling or windshield of the vehicle 700. The stereo cameras 195a and 195b may include a first lens 193a and a second lens 193b.

The stereo cameras 195a and 195b may respectively include a first light shield 192a and a second light shield 192b for blocking light incident on the first lens 193a and the second lens 193b.

The first camera 195a acquires a first image of the front view of the vehicle. The second camera 195b acquires a second image of the front view of the vehicle. The second camera 195b is spaced a predetermined distance from the first camera 195a. As the first and second cameras 195a and 195b are spaced the predetermined distance from each other, disparity occurs and a distance to an object is detectable according to the disparity.

If the driver assistance apparatus 100 includes the stereo cameras 195a and 195b, the processor 170 performs signal processing based on computer vision. Thereby, the processor 170 may acquire stereo images of the front view of the vehicle from the stereo cameras 195a and 195b, perform disparity calculation for the front view of the vehicle based on the stereo images, perform object detection in at least one of the stereo images based on the calculated disparity information, and continue tracking movement of an object after object detection. Herein, the stereo images are based on the first image received from the first camera 195a and the second image received from the second camera 195b.

In particular, in detecting an object, the processor 170 may perform lane detection (LD), vehicle detection (VD), pedestrian detection (PD), bright-spot detection (BD), traffic sign recognition (TSR), and road surface detection.

In addition, the processor 170 may calculate the distance to a detected nearby vehicle, the speed of the detected vehicle, and difference in speed from the detected vehicle.

FIG. 3C is an internal block diagram of the driver assistance apparatus 100 according to another embodiment of the present invention.

Referring to FIG. 3C, the driver assistance apparatus 100 of FIG. 3C differs from the driver assistance apparatus 100 of FIG. 3A in that the driver assistance apparatus 100 of FIG. 3C includes around view cameras 195d, 195e, 195f and 195g. Hereinafter, description will be given focusing on this difference.

The driver assistance apparatus 100 may include around view cameras 195d, 195e, 195f and 195g.

Each of the around view cameras 195d, 195e, 195f and 195g may include a lens and a light shield for blocking light traveling toward the lens.

The around view cameras may include a left camera 195d, a rear camera 195e, a right camera 195f and a front camera 195g.

The left camera 195d acquires an image of the left side of the vehicle. The rear camera 195e acquires an image of the rear of the vehicle. The right camera 195f acquires an image of the right side view of the vehicle. The front camera 195g acquires an image of the front of the vehicle.

Images acquired by the around view cameras 195d, 195e, 195f and 195g are transferred to the processor 170.

The processor 170 may synthesize a left side view image, rear view image, right side view image and front view image of the vehicle to generate a surroundings-of-vehicle image. In this instance, the surroundings-of-vehicle image may be a top view image or bird's eye view image. The processor 170 may receive and synthesize the left side view image, rear view image, right side view image and front view image of the vehicle, and convert the synthesized image into a top view image to generate a surroundings-of-vehicle image.

The processor 170 may detect an object based on the surroundings-of-vehicle image. In particular, in detecting an object, the processor 170 may perform lane detection (LD), vehicle detection (VD), pedestrian detection (PD), bright-spot detection (BD), traffic sign recognition (TSR), and road surface detection.

The processor 170 may individually control zoom of the around view cameras 195d, 195e, 195f and 195g. Zoom control of the processor 170 may be performed in the same manner as zoom control of the stereo cameras described above with reference to FIG. 3B.

Figure 4A:
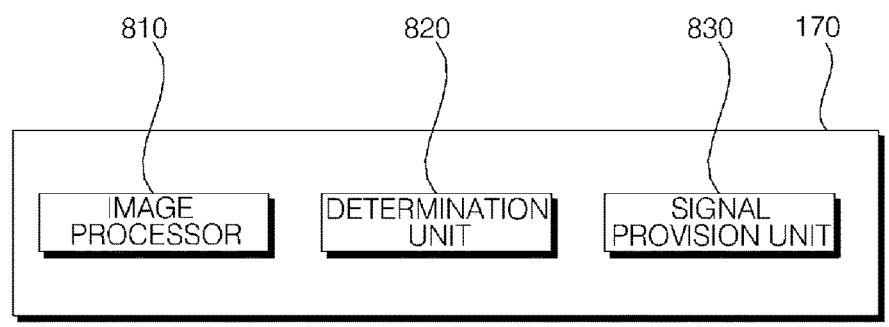
FIGS. 4A to 4C are exemplary internal block diagrams of the processor of FIGS. 3A to 3C.
Figure 4B:
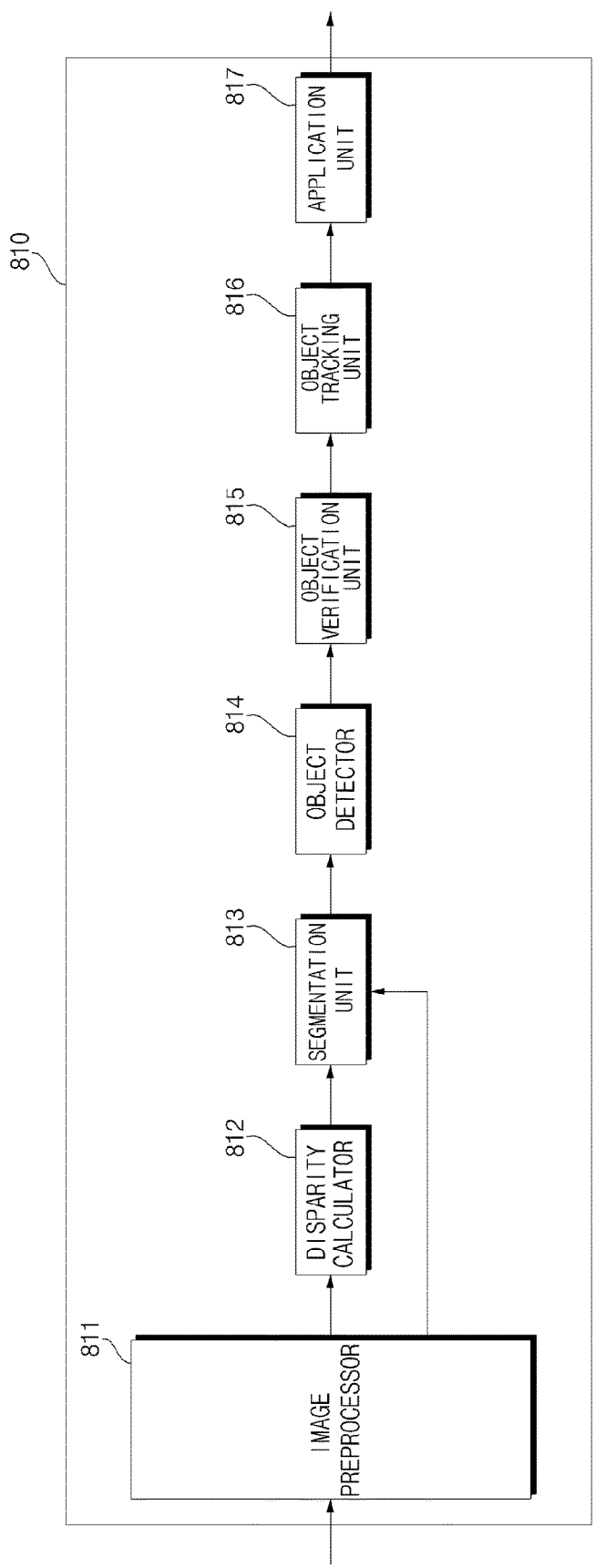
Figure 4C:
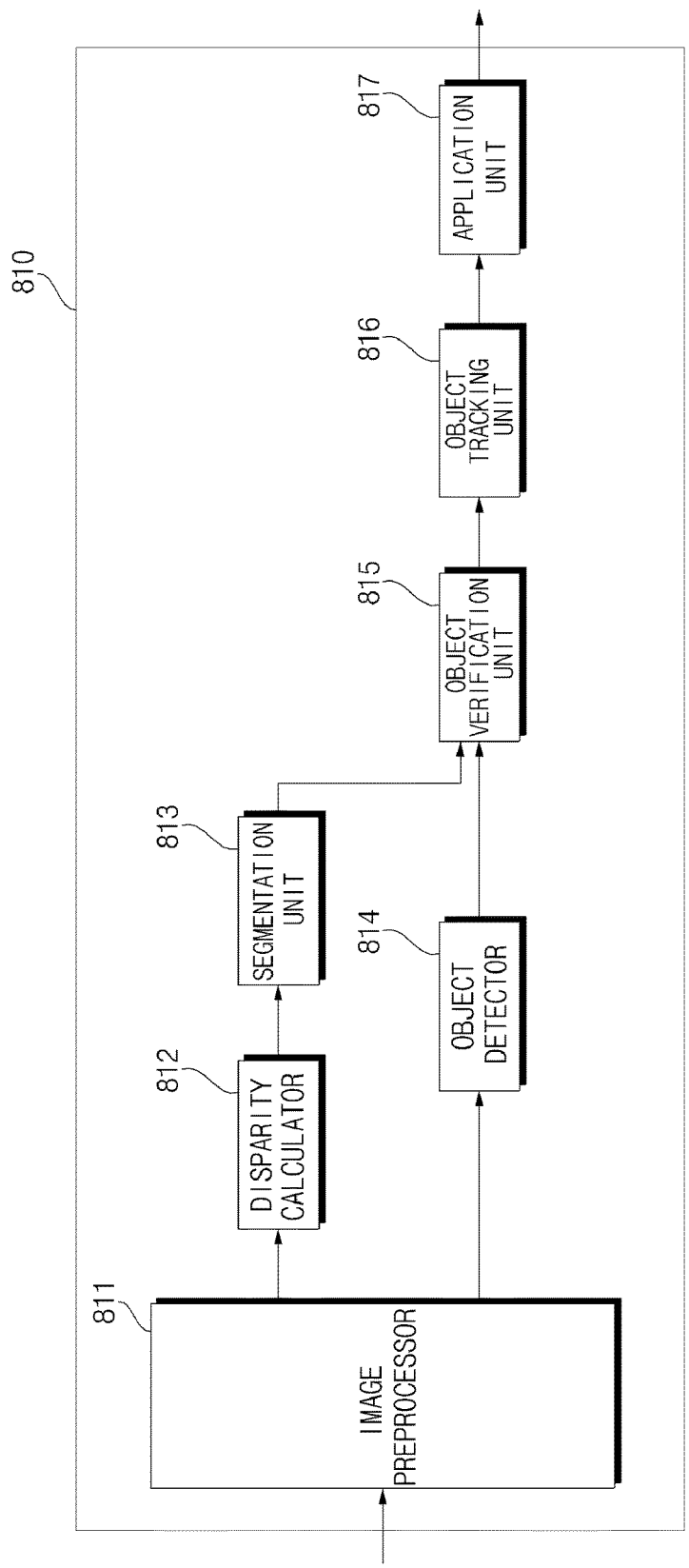

FIGS. 4A to 4C are exemplary internal block diagrams of the processor of FIGS. 3A to 3C, and FIGS. 5A and 5B illustrate operation of the processor of FIGS. 4A to 4C.

Referring to FIG. 4A, the processor 170 may include an image processor 810, a determination unit 820 and a signal provision unit 830.

The image processor 810 may receive an image from the camera 195. Herein, the images may be a vehicle front view image or a surroundings-of-vehicle image. The image may be captured by a mono camera, stereo cameras or around view cameras.

The image processor 810 may detect a drive lane and an object by processing the received image. Herein, the object may be a preceding vehicle, a following vehicle or another vehicle approaching the driver's vehicle 700 from the left side or the right side. The image processor 810 may detect a curve section in front of the vehicle based on the drive lane. The image processor 810 may detect the condition of the road surface.

The image processor 810 may detect the bumper of another vehicle.

The image processor 810 may track an identified object.

Hereinafter, object detection performed by the image processor 810 will be described in detail with reference to FIGS. 4B and 4C.

The determination unit 820 may predict collision with an object. For example, the processor 170 may predict collision with an object based on the distance and relative speed of the object. For example, the processor 170 may compute the time to collision (TTC) with the object. If the TTC is less than or equal to a reference value, the processor 170 may predict occurrence of collision with the object.

For example, the determination unit 820 may predict collision with a preceding vehicle. The determination unit 820 may predict collision with a following vehicle. The determination unit 820 may predict collision with a preceding vehicle after collision with a following vehicle occurs. The determination unit 820 may predict collision with another vehicle approaching from the left side or the right side. The determination unit 820 may sense overturn of the driver's vehicle 700 after collision with another vehicle approaching from the left side or the right side occurs.

The signal provision unit 830 may provide a control signal to the vehicle drive unit 750.

The signal provision unit 830 may provide a suspension height control signal to the suspension drive unit 759. The suspension drive unit 759 may control the suspension apparatus according to the suspension height control signal.

The signal provision unit 830 may provide a steering control signal to the steering drive unit 752. The steering drive unit 752 may control the steering apparatus according to the steering control signal.

The signal provision unit 830 may provide a power interruption control signal to the power source drive unit 751. The power source drive unit 751 may control the power source according to the power interruption control signal.

The signal provision unit 830 may provide a full-braking control signal to the brake drive unit 753. The brake drive unit 753 may control the brake apparatus according to the full-braking control signal.

Referring to FIG. 4B, which is an exemplary internal block diagram of the image processor 401, the image processor 401 may include an image preprocessor 811, a disparity calculator 812, an object detector 814, an object tracking unit 816, and an application unit 817.

The image preprocessor 811 may receive an image from the camera 195 and perform preprocessing of the image.

Specifically, the image preprocessor 811 may perform noise reduction, rectification, calibration, color enhancement, color space conversion (CSC), interpolation and camera gain control for the image. Thereby, a clearer image than the stereo image captured by the camera 195 may be acquired.

The disparity calculator 812 may receive an image signal-processed by the image preprocessor 811, perform stereo matching upon the received image, and acquire a disparity map according to the stereo matching. That is, the disparity calculator 812 may acquire disparity information on the stereo image of the front view of the vehicle.

Herein, stereo matching may be performed in a pixel unit or a predetermined block unit of the stereo image. The disparity map may represent a map indicating numerical values representing binocular parallax information about the stereo images.

The segmentation unit 813 may perform segmentation and clustering of at least one of the images based on the disparity information from the disparity calculator 812.

Specifically, the segmentation unit 813 may separate the background from the foreground in at least one of the stereo images based on the disparity information.

For example, a region of the disparity map which has disparity information less than or equal to a predetermined value may be calculated as the background and excluded. Thereby, the foreground may be separated from the background.

As another example, a region having disparity information greater than or equal to a predetermined value in the disparity map may be calculated as the foreground and the corresponding part may be excluded. Thereby, the foreground may be separated from the background.

By separating the foreground from the background based on the disparity information extracted based on the stereo images, signal processing speed may be increased and signal-processing load may be reduced in the subsequent object detection operation.

The object detector 814 may detect an object based on an image segment from the segmentation unit 813.

That is, the object detector 814 may detect an object in at least one of images based on the disparity information.

Specifically, the object detector 814 may detect an object in at least one of the images. For example, the object detector 814 may detect an object in the foreground separated by the image segment.

Next, the object verification unit 815 may classify and verify the separated object.

The object verification unit 815 may use an identification technique employing a neural network, a support vector machine (SVM) technique, an identification technique based on AdaBoost using Haar-like features or the histograms of oriented gradients (HOG) technique.

The object verification unit 815 may verify an object by comparing the detected object with objects stored in the memory 140.

For example, the object verification unit 815 may verify a nearby vehicle, a lane, a road surface, a signboard, a dangerous area, a tunnel, and the like which are positioned around the vehicle.

The object tracking unit 816 may track the verified object. For example, the object tracking unit 816 may sequentially perform verification of an object in the acquired stereo images and computation of the motion or motion vector of the verified object, thereby tracking movement of the object based on the computed motion or motion vector. Thereby, the object tracking unit 816 may track a nearby vehicle, a lane, a road surface, a signboard, a hazard zone, a tunnel, and the like which are positioned around the vehicle.

Next, the application unit 817 may calculate dangerousness to the vehicle 700 based on various objects positioned near the vehicle, for example, another vehicle, a lane, a road surface, a signboard, and the like. In addition, the application unit 817 may calculate possibility of collision with a preceding vehicle and slippage of the vehicle.

In addition, the application unit 817 may output a message for delivering information such as the calculated dangerousness, collision possibility or slippage as driving assistance information. Alternatively, the application unit 817 may generate a control signal for controlling the position or movement of the vehicle 700 as vehicle control information.

The image preprocessor 811, the disparity calculator 812, the segmentation unit 813, the object detector 814, the object verification unit 815, the object tracking unit 816 and the application unit 817 may be internal constituents of the image processor 810 in the processor 170 in FIG. 7 and subsequent figures.

According to an embodiment, the processor 170 may include only some of the imaging preprocessor 811, the disparity calculator 812, the segmentation unit 813, the object detector 814, the object verification unit 815, the object tracking unit 816 and the application unit 817. For example, if the camera 195 is a mono camera or an around view camera, the disparity calculator 812 may be excluded. According to an embodiment, the segmentation unit 813 may be excluded.

FIG. 4C is another exemplary internal block diagram of the processor.

Referring to FIG. 4C, the image processor 810 of FIG. 4C has the same internal constituent units as those of the image processor 810 of FIG. 4B, but has a different signal processing sequence. Hereinafter, the different signal processing sequence will be described.

The object detector 814 may receive stereo images and detect an object in at least one of the stereo images. In contrast with the example of FIG. 4B, the object may be directly detected in the stereo images rather than being detected in a segmented image based on the disparity information.

Next, the object verification unit 815 classifies and verifies an object detected and separated based on an image segment from the segmentation unit 813 and objects detected by the object detector 814.

The object verification unit 815 may use an identification technique employing a neural network, the support vector machine (SVM) technique, an identification technique based on AdaBoost using Haar-like features, or the histograms of oriented gradients (HOG) technique.

Figure 5B:
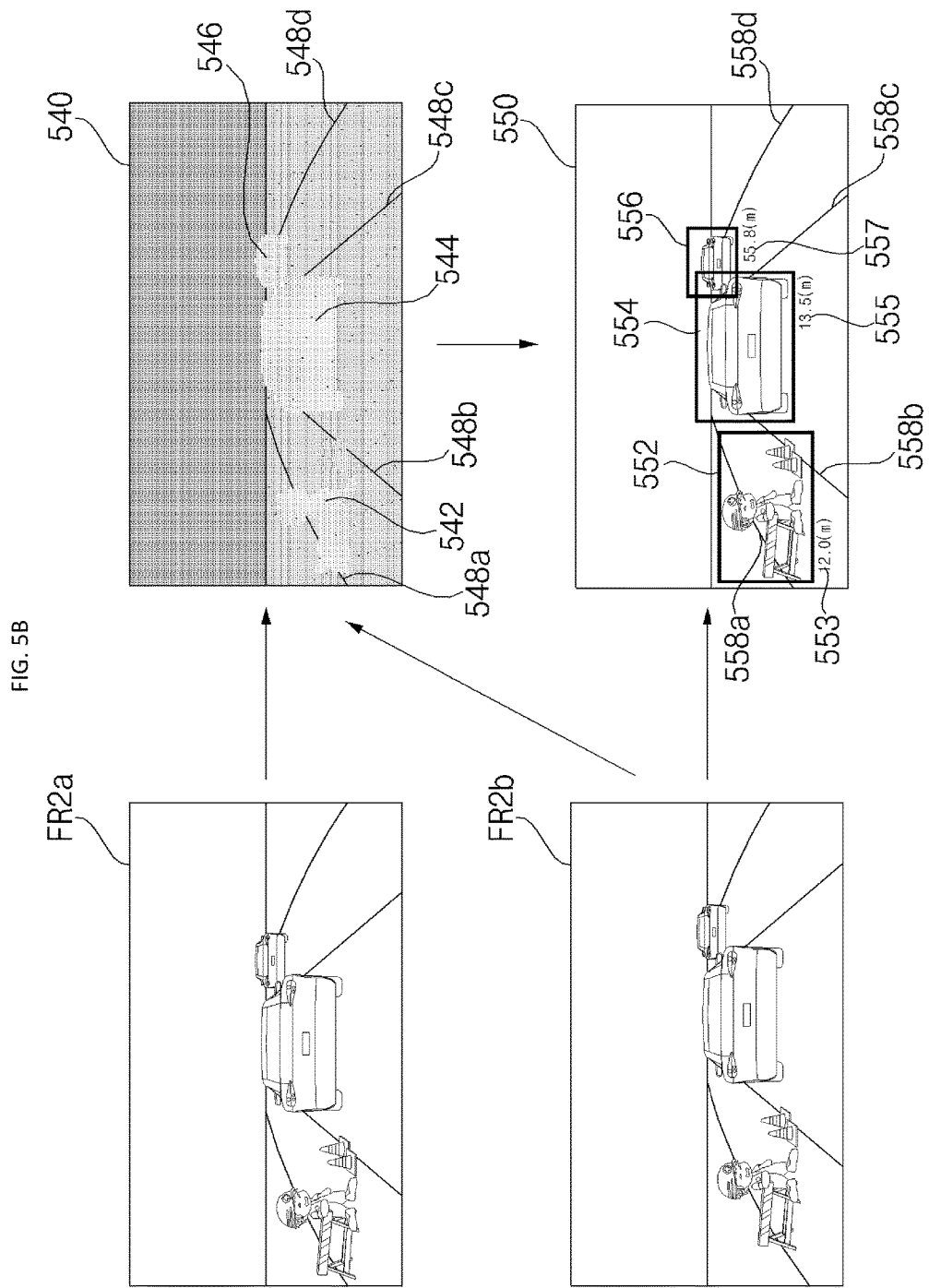

FIGS. 5A and 5B illustrate operation of the processor 170 of FIGS. 4A to 4C based on stereo images acquired in first and second frame intervals, respectively.

Referring to FIG. 5A, the stereo camera 195 acquires a stereo image in the first frame interval.

The disparity calculator 812 in the processor 170 receives stereo images FR1a and FR1b signal-processed by the image preprocessor 811, and performs stereo matching on the received stereo images FR1a and FR1b, thereby acquiring a disparity map 520.

The disparity map 520 provides levels of disparities between the stereo images FR1a and FR1b. The disparity level is inversely proportional to the distance to the vehicle.

When the disparity map is displayed, high brightness may be provided to a high disparity level and a low brightness may be provided to a low disparity level.

In FIG. 5A, first to fourth lane lines 528a, 528b, 528c and 528d have corresponding disparity levels and a construction area 522, a first preceding vehicle 524 and a second preceding vehicle 526 have corresponding disparity levels in the disparity map 520.

The segmentation unit 432, the object detector 814, and the object verification unit 436 perform segmentation, object detection and object verification for at least one of the stereo images FR1a and FR1b based on the disparity map 520.

In the example illustrated in the figure, object detection and verification are performed for the second stereo image FR1b using the disparity map 520.

That is, object detection and verification may be performed for the first to fourth lane lines 538a, 538b, 538c and 538d, the construction area 532, the first preceding vehicle 534, and the second preceding vehicle 536.

Next, referring to FIG. 5B, the stereo camera 195 acquires a stereo image in the second frame interval.

The disparity calculator 812 in the processor 170 receives stereo images FR2a and FR2b signal-processed by the image preprocessor 811, and performs stereo matching on the received stereo images FR2a and FR2b, thereby acquiring a disparity map 540.

In the figure, first to fourth lane lines 548a, 548b, 548c and 548d have corresponding disparity levels, and a construction area 542, a first preceding vehicle 544 and a second preceding vehicle 546 have corresponding disparity levels in the disparity map 540.

The segmentation unit 432, the object detector 814, and the object verification unit 436 perform segmentation, object detection and object verification for at least one of the stereo images FR2a and FR2b based on the disparity map 540.

The figure illustrates object detection and verification performed for the second stereo image FR2b using the disparity map 540.

That is, object detection and verification may be performed for the first to fourth lane lines 548a, 548b, 548c and 548d, construction area 552, first preceding vehicle 554, and second preceding vehicle 556 in the image 550.

The object tracking unit 816 may track a verified object by comparing FIGS. 5A and 5B.

Specifically, the object tracking unit 816 may track movement of an object based on motions or motion vectors of respective objects verified in FIGS. 5A and 5B. Thereby, lanes, a construction area, a first preceding vehicle, a second preceding vehicle and the like positioned around the vehicle may be tracked.

Figure 6A:
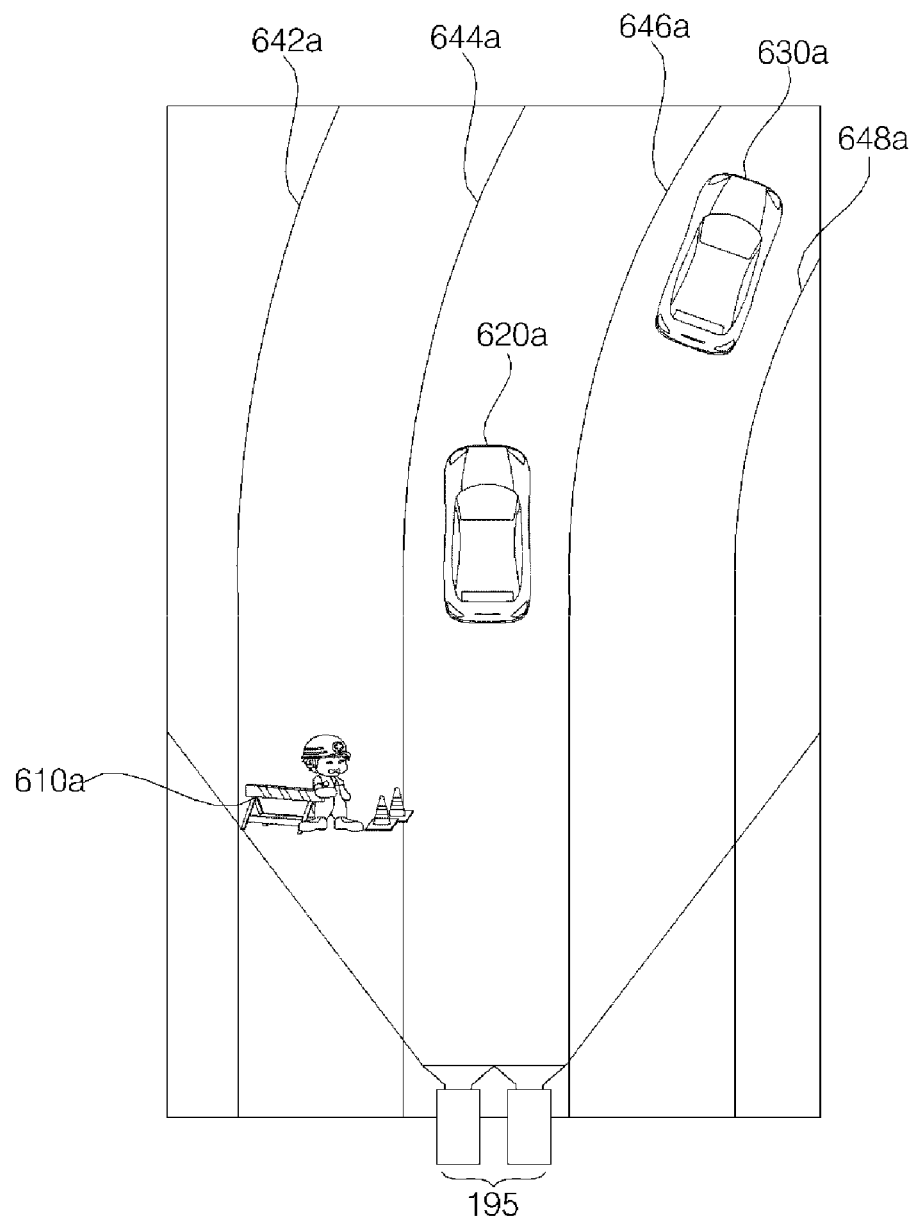
FIGS. 6A and 6B illustrate operation of the driver assistance apparatus of FIGS. 3A to 3C.
Figure 6B:
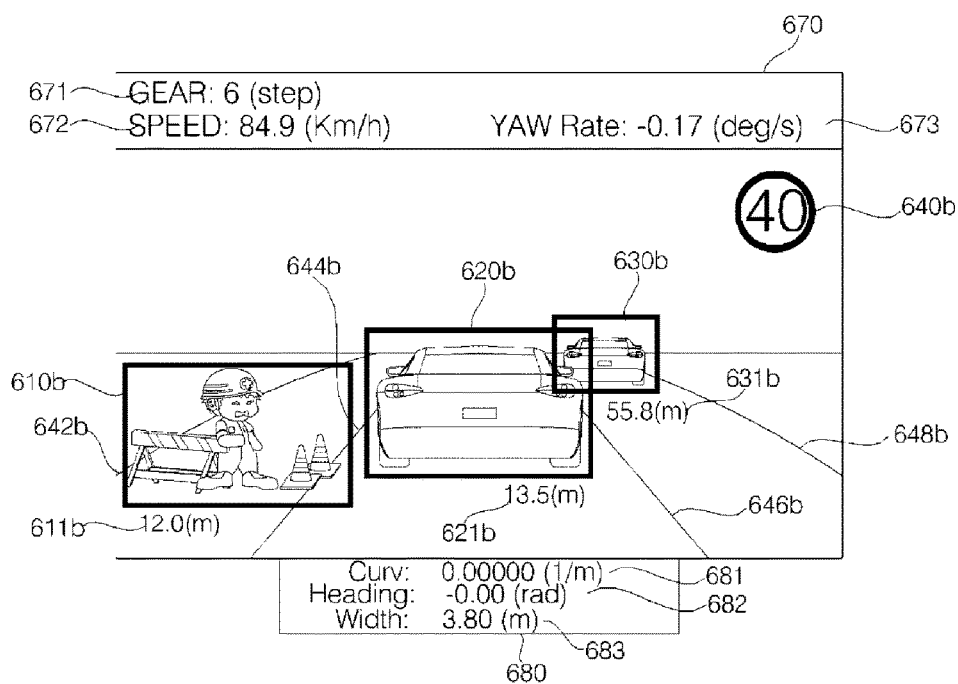

FIGS. 6A and 6B illustrate operation of the driver assistance apparatus of FIGS. 3A to 3C.

FIG. 6A illustrates an exemplary front situation of the vehicle whose images are captured by the stereo camera 195 provided in the vehicle. In particular, the vehicle front situation is displayed as a bird's eye view image.

Referring to FIG. 6A, a first lane line 642a, a second lane line 644a, a third lane line 646a, and a fourth lane line 648a are positioned from left to right. A construction area 610a is positioned between the first lane line 642a and the second lane line 644a, a first preceding vehicle 620a is positioned between the second lane line 644a and the third lane line 646a, and a second preceding vehicle 630a is positioned between the third lane line 646a and the fourth lane line 648a.

FIG. 6B illustrates displaying a vehicle front situation recognized by the driver assistance apparatus along with various kinds of information. In particular, the image shown in FIG. 6B may be displayed by the display unit 180, the vehicle display apparatus 400 or the display unit 741, which is provided by the driver assistance apparatus.

FIG. 6B illustrates displaying information based on images captured by the stereo camera 195, in contrast with the example of FIG. 6A.

Referring to FIG. 6B, a first lane line 642b, a second lane line 644b, a third lane line 646b, and a fourth lane line 648b are presented from the left to the right. A construction area 610b is positioned between the first lane line 644b and the second lane line 644b, a first preceding vehicle 620b is positioned between the second lane line 644b and the third lane line 646b, and a second preceding vehicle 630b is positioned within the third lane line 646b and the fourth lane line 648b.

The driver assistance apparatus 100 may perform signal processing based on the stereo images captured by the stereo cameras 195a and 195b, thereby verifying objects corresponding to the construction area 610b, the first preceding vehicle 620b and the second preceding vehicle 630b. In addition, the driver assistance apparatus 100 may verify the first lane line 642b, the second lane line 644b, the third lane line 646b and the fourth lane line 648b.

In the figure, to indicate that the objects corresponding to the construction area 610b, the first preceding vehicle 620b and the second preceding vehicle 630b are verified, the objects are highlighted using edge lines.

The driver assistance apparatus 100 may calculate distance information on the construction area 610b, the first preceding vehicle 620b and the second preceding vehicle 630b based on the stereo images captured by the stereo camera 195.

In the figure, first calculated distance information 611b, second calculated distance information 620b and third calculated distance information 630b corresponding to the construction area 610b, the first preceding vehicle 620b and the second preceding vehicle 630b respectively are displayed.

The driver assistance apparatus 100 may receive sensor information about the vehicle from the controller 770 or the sensing unit 760. In particular, the driver assistance apparatus 100 may receive and display the vehicle speed information, gear information, yaw rate information indicating a variation rate of the yaw of the vehicle and orientation angle information about the vehicle.

In the figure, vehicle speed information 672, gear information 671 and yaw rate information 673 are displayed on the upper portion 670 of the vehicle front view image, and vehicle orientation angle information 682 is displayed on the lower portion 680 of the vehicle front view image. However, various examples other than the illustrated example are possible. Additionally, vehicle width information 683 and road curvature information 681 may be displayed along with the vehicle orientation angle information 682.

The driver assistance apparatus 100 may receive speed limit information about the road on which the vehicle is traveling, through the communication unit 120 or the interface unit 130. In the figure, the speed limit information 640b is displayed.

The driver assistance apparatus 100 may display various kinds of information shown in FIG. 6B through, for example, the display unit 180. Alternatively, the driver assistance apparatus 100 may store the various kinds of information without a separate display operation. In addition, the information may be utilized for various applications.

FIG. 7 is an exemplary internal block diagram of the vehicle of FIG. 1.

The vehicle 700 may include a communication unit 710, an input unit 720, a sensing unit 760, an output unit 740, a vehicle drive unit 750, a memory 730, an interface unit 780, a controller 770, a power supply 790, a driver assistance system 100, and a display apparatus 400 for the vehicle.

The communication unit 710 may include at least one module enabling wireless communication between the vehicle 700 and a mobile terminal 600, between the vehicle 700 and an external server 601, or between the vehicle 700 and another vehicle 602. The communication unit 710 may also include at least one module for connecting the vehicle 700 to at least one network.

The communication unit 710 may include a broadcast reception module 711, a wireless Internet module 712, a short-range communication module 713, a location information module 714, an optical communication module 715, and a V2X communication module 716.

The broadcast reception module 711 receives a broadcast signal or broadcast-related information from an external broadcast management server over a broadcast channel. Herein, the broadcast includes radio broadcast or TV broadcast.

The wireless Internet module 712, which refers to a module for wireless Internet access, may be internally or externally installed to the vehicle 700. The wireless Internet module 712 is configured to transmit and receive a radio signal over a communication network according to wireless Internet technologies.

Examples of wireless Internet technologies include Wireless LAN (WLAN), Wi-Fi, Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 712 transmits and receives data according to at least one of the aforementioned wireless Internet technologies. For example, the wireless Internet module 712 may wirelessly exchange data with the external server 601. The wireless Internet module 712 may receive weather information and traffic situation information (e.g., TPEG (Transport Protocol Expert Group)) from the external server 601.

The short-range communication module 713, which is used for short-range communication, may support short-range communication using at least one of Bluetooth™ Radio Frequency Identification (RFID), Infrared Data Association (IrDA), ultra wideband (UWB), ZigBee, Near Field Communication (NFC), Wi-Fi, Wi-Fi Direct, and Wireless Universal Serial Bus (Wireless USB) technologies.

The short-range communication module 713 may establish a wireless local area network to implement short-range communication between the vehicle 700 and at least one external device. For example, the short-range communication module 713 may wirelessly exchange data with the mobile terminal 600. The short-range communication module 713 may receive weather information and traffic situation information (e.g., TPEG (Transport Protocol Expert Group)) from the mobile terminal 600. For example, once a user enters the vehicle 700, the mobile terminal 600 of the user may be paired with the vehicle 700 automatically or by execution of an application by the user.

A typical example of the location information module 714, which serves to acquire the location of the vehicle 700, is a global positioning system (GPS) module. For example, if the vehicle utilizes the GPS module, the location of the vehicle may be acquired using a signal from a GPS satellite.

The optical communication module 715 may include a light transmitter and a light receiver.

The light receiver may covert a light signal into an electrical signal to receive information. The light receiver may include a photodiode (PD) for receiving light. The PD is capable of converting light into an electrical signal. For example, the light receiver may receive information on a preceding vehicle through light emitted from a light source included in the foregoing vehicle.

The light transmitter may include at least one light emitting device for converting an electrical signal into a light signal. Preferably, the light emitting device is a light emitting diode (LED). The light transmitter converts an electrical signal into a light signal and transmits the light signal outside. For example, the light transmitter transmits a light signal by blinking a light emitting device at a predetermined frequency. According to some embodiments, the light transmitter may include an array of a plurality of light emitting devices. According to some embodiments, the light transmitter may be integrated with a lamp provided to the vehicle 700. For example, the light transmitter may be at least one of a headlight, a taillight, a stop lamp, a turn signal lamp and a sidelight. For example, the optical communication module 715 may exchange data with the vehicle 602 through optical communication.

The V2X communication module 716 serves to perform wireless communication with the server 601 or another vehicle 602. The V2X communication module 716 includes a module capable of implementing a vehicle-to-vehicle communication (V2V) protocol or a vehicle-to-infrastructure communication (V2I) protocol. The vehicle 700 may perform wireless communication with the external server 601 or the vehicle 602 through the V2X communication module 716.

The input unit 720 may include a driving manipulation means 721, a camera 195, a microphone 723 and a user input unit 724.

The driving manipulation means 721 receives user input for driving the vehicle 700. The driving manipulation means 721 may include a steering input means 721a, a shift input means 721b, an acceleration input means 721c, and a brake input means 721d.

The steering input means 721a receives a travel direction input of the vehicle 700 from the user. Preferably, the steering input means 721a is formed in the shape of a wheel to allow steering input through rotation. According to some embodiments, the steering input means 721a may include a touchscreen, a touch pad, or a button.

The shift input means 721b receives, from the user, inputs for Park (P), Drive (D), Neutral (N) and Reverse (R) of the vehicle 700. Preferably, the shift input means 721b is formed in the shape of a lever. According to some embodiments, the shift input means 721b may include a touchscreen, a touch pad, or a button.

The acceleration input means 721c receives an input for accelerating the vehicle 700 from the user. The brake input means 721d receives an input for decelerating the vehicle 700 from the user. Preferably, the acceleration input means 721c and the brake input means 721d are formed in the shape of a pedal. According to some embodiments, the acceleration input means 721c or the brake input means 721d may include a touchscreen, a touch pad, or a button.

The camera 195 may include an image sensor and an image processing module. The camera 195 may process a still image or a moving image obtained by the image sensor (e.g., CMOS or CCD). The processing module may extract necessary information by processing the still image or moving image obtained through the image sensor, and transfer the extracted information to the controller 770. The vehicle 700 may include a camera 195 for capturing a vehicle front view image or a surroundings-of-vehicle image and an interior camera 195c for capturing images of the interior of the vehicle.

The interior camera may acquire an image of passengers. The interior camera may acquire an image for biometric recognition of the passengers.

The interior camera may acquire an image of the passengers in the vehicle 700, thereby detecting the number of the passengers.

While FIG. 7 illustrates the camera 195 as being included in the input unit 720, the camera 195 may be a constituent included in the driver assistance apparatus 100 as described above with reference to FIGS. 2 to 6.

The microphone 723 may process an external sound signal to create electrical data. The data created through processing may be utilized for various purposes according to functions being executed by the vehicle 700. The microphone 723 may convert a voice command from the user into electrical data. The electrical data may be delivered to the controller 770.

According to an embodiment, the camera 195 or microphone 723 may be a constituent included in the sensing unit 760 rather than in the input unit 720.

The user input unit 724 is intended to receive information input by the user. When information is input through the user input unit 724, the controller 770 may control operation of the vehicle 700 in accordance with the input information. The user input unit 724 may include a touch input means or a mechanical input means. According to some embodiments, the user input unit 724 may be disposed in one area of the steering wheel. In this instance, the driver may manipulate the user input unit 724 with fingers while holding the steering wheel.

The sensing unit 760 senses a signal related to traveling of the vehicle 700. The sensing unit 760 may include a collision sensor, a wheel sensor, a speed sensor, a tilt sensor, a weight sensor, a heading sensor, a yaw sensor, a gyro sensor, a position module, a vehicle drive/reverse sensor, a battery sensor, a fuel sensor, a tire sensor, a steering sensor based on turning of the steering wheel, a vehicle interior temperature sensor, a vehicle interior humidity sensor, a rain sensor, an ultrasonic sensor, radar, and lidar (Light Detection And Ranging).

Thereby, the sensing unit 760 may acquire sensing signals carrying vehicle collision information, vehicle direction information, vehicle location information (GPS information), vehicle orientation information, vehicle speed information, vehicle acceleration information, vehicle inclination information, vehicle drive/reverse information, battery information, fuel information, tire information, vehicle lamp information, vehicle interior temperature information, vehicle interior humidity information, information about whether it rains, and an angle by which the steering wheel is rotated.

The sensing unit 760 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crankshaft angle sensor (CAS).

The sensing unit 760 may include a biometric identification information sensing unit. The biometric identification information sensing unit senses and acquires biometric identification information of a passenger. The biometric identification information may include fingerprint information, iris scan information, retina scan information, hand geometry information, facial recognition information, and voice recognition information. The biometric identification information sensing unit may include a sensor for sensing biometric identification information of a person in the vehicle. Herein, the interior camera and the microphone 723 may operate as sensors. The biometric recognition information sensing unit may acquire hand shape information and face recognition information through the interior camera.

The output unit 740, which serves to output information processed by the controller 770, may include a display unit 741, a sound output unit 742 and a haptic output unit 743.

The display unit 741 may display information processed by the controller 770. For example, the display unit 741 may display vehicle-related information. Herein, the vehicle-related information may include vehicle control information for controlling the direction of the vehicle or vehicle driving assistance information for assisting the driver in driving the vehicle. The vehicle-related information may also include vehicle condition information indicating the current condition of the vehicle or vehicle driving information related to driving.

The display unit 741 may include at least one of a liquid crystal display (LCD), a thin film transistor-liquid crystal display (TFT LCD), an organic light-emitting diode (OLED) display, a flexible display, a 3D display and an e-ink display.

The display unit 741 may form a layered architecture together with a touch sensor or be integrated with the touch sensor, thereby implementing a touchscreen. Such touchscreen may function as the user input unit 724 providing an input interface between the vehicle 700 and the user and also as an output interface between the vehicle 700 and the user. In this instance, the display unit 741 may include a touch sensor for sensing touch applied to the display unit 741 in order to receive a control command in a touch manner. Thereby, when the display unit 741 is touched, the touch sensor may sense the touch, and the controller 770 may generate a control command corresponding to the touch. Content input through touch may include characters, numbers, or menu items which can be indicated or specified in various modes.

The display unit 741 may include a cluster to allow the driver to check the vehicle condition information or vehicle driving information during driving. The cluster may be positioned on the dashboard. In this instance, the driver can check the information displayed on the cluster while looking forward.

According to some embodiments, the display unit 741 may be implemented as a head up display (HUD). If the display unit 741 is implemented as the HUD, information may be output through a transparent display provided to the windshield. Alternatively, the display unit 741 may be provided with a projection module, thereby outputting information through an image projected onto the windshield.

The sound output unit 742 converts an electrical signal from the controller 770 into an audio signal and outputs the audio signal. The sound output unit 742 may be provided with a speaker. The sound output unit 742 may output sound corresponding to operation of the user input unit 724.

The haptic output unit 743 generates haptic output. For example, the haptic output unit 743 may vibrate the steering wheel, a seat belt and a seat to allow the user to recognize the output.

The vehicle drive unit 750 may control operation of various vehicular devices. The vehicle drive unit 750 may receive a control signal from the driver assistance apparatus 100. The vehicle drive unit 750 may control various devices based on the control signal.

The vehicle drive unit 750 may include a power source drive unit 751, a steering drive unit 752, a brake drive unit 753, a lamp drive unit 754, an air conditioning drive unit 755, a window drive unit 756, an airbag drive unit 757, a sunroof drive unit 758 and a suspension drive unit 759.

The power source drive unit 751 may perform electronic control of the power source in the vehicle 700.

For example, if a fossil fuel-based engine is the power source, the power source drive unit 751 may perform electronic control of the engine. Thereby, the output torque of the engine may be controlled. If the power source drive unit 751 is an engine, the output torque of the engine may be controlled by the controller 770 to limit the speed of the vehicle.

As another example, if an electric motor is the power source, the power source drive unit 751 may control the motor. Thereby, the rotational speed and torque of the motor may be controlled.

The power source drive unit 751 may receive an acceleration control signal from the driver assistance apparatus 100. The power source drive unit 751 may control the power source according to the received acceleration control signal.

The steering drive unit 752 may perform electronic control of the steering apparatus in the vehicle 700. Thereby, the steering drive unit 752 may change the travel direction of the vehicle. The steering drive unit 752 may receive a steering control signal from the driver assistance apparatus 100. The steering drive unit 752 may control the steering apparatus to be steered according to the steering control signal.

The brake drive unit 753 may perform electronic control of a brake apparatus in the vehicle 700. For example, by controlling the operation of the brakes disposed on the wheels, the speed of the vehicle 700 may be reduced. In another example, the brake disposed on a left wheel may be operated differently from the brake disposed on a right wheel in order to adjust the travel direction of the vehicle 700 to the left or right. The brake drive unit 753 may receive a deceleration control signal from the driver assistance apparatus 100. The brake drive unit 753 may control the brake apparatus according to the received deceleration control signal.

The lamp drive unit 754 may control lamps disposed inside and outside the vehicle to be turned on/off. In addition, the lamp drive unit 754 may control the intensity and direction of light from the lamps. For example, the lamp drive unit 754 may control a turn signal lamp and a brake lamp.

The air conditioning drive unit 755 may perform electronic control of an air conditioner in the vehicle 700. For example, if the temperature of the interior of the vehicle is high, the air conditioning drive unit 755 may control the air conditioner to supply cool air to the interior of the vehicle.

The window drive unit 756 may perform electronic control of a window apparatus in the vehicle 700. For example, the window drive unit 756 may control opening or closing of the left and right windows on both sides of the vehicle.

The airbag drive unit 757 may perform electronic control of an airbag apparatus in the vehicle 700. For example, the unit may control the airbag apparatus such that the airbags are inflated when the vehicle is exposed to danger.

The sunroof drive unit 758 may perform electronic control of a sunroof apparatus in the vehicle 700. For example, the sunroof drive unit 758 may control opening or closing of the sunroof.

The suspension drive unit 759 may perform electronic control of a suspension apparatus in the vehicle 700. For example, when a road surface is uneven, the suspension drive unit 759 may control the suspension apparatus to attenuate vibration of the vehicle 700. The suspension drive unit 759 may receive a suspension control signal from the driver assistance apparatus 100. The suspension drive unit 759 may control the suspension apparatus according to the received suspension control signal.

The memory 730 is electrically connected to the controller 770. The memory 730 may store basic data for each unit, control data for controlling operation of each unit, and input/output data. When implemented through hardware, the memory 730 may include various storage devices such as a ROM, RAM, EPROM, flash drive, and hard drive. The memory 730 may store various kinds of data for overall operation of the vehicle 700 including a program for processing or controlling operation of the controller 770.

The interface unit 780 may serve as a path between the vehicle 700 and various kinds of external devices connected thereto. For example, the interface unit 780 may be provided with a port connectable to the mobile terminal 600, thus being connected to the mobile terminal 600 through the port. In this instance, the interface unit 780 may exchange data with the mobile terminal 600.

The interface unit 780 may also serve as a path through which electrical energy is supplied to the mobile terminal 600 connected thereto. If the mobile terminal 600 is electrically connected to the interface unit 780, the interface unit 780 is controlled by the controller 770 to provide the mobile terminal 600 with electrical energy supplied from the power supply 790.

The controller 770 may control overall operations of the respective units in the vehicle 700. The controller 770 may be called an electronic control unit (ECU).

The controller 770 may be implemented as hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The power supply 790 may be controlled by the controller 770 to supply electric power necessary for operation of respective constituents. In particular, the power supply 790 may receive power from, for example, a battery in the vehicle.

The driver assistance apparatus 100 may exchange data with the controller 770. A control signal generated from the driver assistance apparatus 100 may be output to the controller 770. The driver assistance apparatus 100 may be the driver assistance apparatus described above with reference to FIGS. 1 to 6B.

The display apparatus 400 may exchange data with the controller 770. The controller 770 may receive navigation information from the display apparatus 400 or a separate navigation apparatus. Herein, the navigation information may include destination information, route information according to the destination, map information, or vehicle location information, wherein the map information and the vehicle location information are related to traveling of the vehicle.

Figure 8:
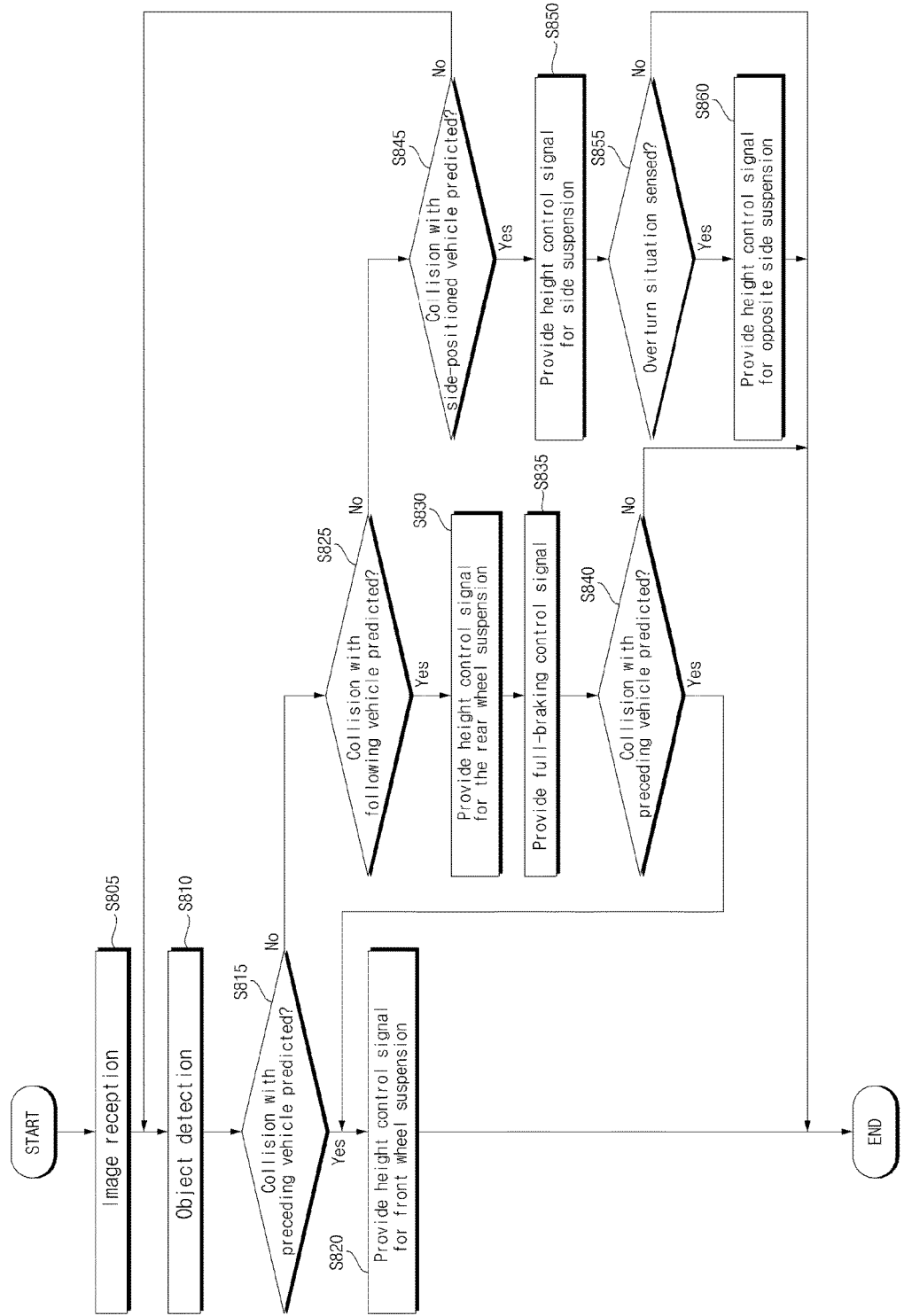
FIG. 8 is a flowchart illustrating a driver assistance apparatus according to one embodiment of the present invention.

FIG. 8 is a flowchart illustrating a driver assistance apparatus according to one embodiment of the present invention.

Referring to FIG. 8, the processor 170 may receive an image acquired by the camera 195 (S805). Herein, the image may be a vehicle front view image or a surroundings-of-vehicle image. Herein, the camera 195 may include a mono camera, stereo cameras 195a and 195b or around view cameras 195d, 195e, 195f and 195g.

The processor 170 may detect an object in the received image (S810). The processor 170 may recognize the object detected by comparing the image with data stored in the memory 140. The processor 170 may track the recognized object. Herein, the object may be a preceding vehicle, a following vehicle, or another vehicle positioned on one side of the vehicle.

The processor 170 may calculate a distance to the detected object. For example, the processor 170 may calculate the distance to the object based on variation in the recognized size of the object over time. Alternatively, the processor 170 may calculate the distance to the object based on disparity. Alternatively, the processor 170 may calculate the distance to the object based on Time of Flight (TOF).

The processor 170 may calculate a relative speed of the object based on the detected distance. For example, the processor 170 may calculate the relative speed of the object by calculating the change in distance of the object per unit time.

The processor 170 may detect the speed of the object based on the travel speed of the driver's vehicle 700 and the relative speed.

The processor 170 may predict collision with a preceding vehicle (S815). The processor 170 may predict collision with a preceding vehicle based on the distance and relative speed of the preceding vehicle. For example, the processor 170 may calculate the time to collision (TTC) with the preceding vehicle. If the TTC is less than a reference value, the processor 170 may predict occurrence of collision.

If collision with the preceding vehicle is predicted, the processor 170 may provide a height control signal for a front wheel suspension (S820).

For example, when the brake is suddenly applied with collision with a preceding vehicle predicted, the processor 170 may provide a control signal for raising the suspension of the front wheels. In this instance, the processor 170 may provide a control signal for raising the suspension of the front wheels such that the rear bumper of the preceding vehicle collides with the front bumper of the driver's vehicle 700.

When the brake is suddenly applied, nose dive occurs. In this instance, the vehicle 700 may be subjected to shock as the front part of the vehicle 700 burrows into the space below the rear bumper of the preceding vehicle. If the driver assistance apparatus 100 is actuated, nose dive may be addressed and thus corresponding damage may be prevented.

The height control signal for the front wheel suspension may be provided to the suspension drive unit 759. The suspension drive unit 759 may control the suspension apparatus according to the provided control signal.

The processor 170 may predict collision with a following vehicle (S825). For example, the processor 170 may predict collision with the following vehicle based on the distance and relative speed of the following vehicle. For example, the processor 170 may compute time to collision (TTC) with the following vehicle. If the TTC is less than a reference value, the processor 170 may predict occurrence of collision.

If collision with the following vehicle is predicted, the processor 170 may provide a height control signal for the rear wheel suspension (S830).

For example, when the vehicle is suddenly braked with collision with the following vehicle predicted, the processor 170 may provide a control signal for lowering the suspension of the rear wheels. In this instance, the processor 170 may provide a control signal for lowering the suspension of the rear wheels such that the front bumper of the following vehicle collides with the rear bumper of the driver's vehicle 700.

When the vehicle is suddenly braked, nose dive occurs. In this instance, shock may be applied to the driver's vehicle 700 as the following vehicle burrows into the space below the rear bumper of the driver's vehicle 700 with the rear part of the driver's vehicle lifted. In some cases, the driver's vehicle 700 may flip over. If the driver assistance apparatus 100 is actuated, nose dive may be addressed and corresponding damage may be prevented.

The rear wheel suspension height control signal may be provided to the suspension drive unit 759. The suspension drive unit 759 may control the suspension apparatus according to the provided control signal.

After collision with the following vehicle occurs, the processor 170 may provide a control signal for performing full-braking (S835). The control signal for performing full-braking may be provided to the brake drive unit 753. The brake drive unit 753 may control the brake apparatus according to the provided control signal. In this instance, the driver assistance apparatus 100 may prevent collision with a preceding vehicle from occurring after collision with the following vehicle occurs.

The processor 170 may predict collision with a preceding vehicle after collision with the following vehicle occurs (S840). The processor 170 may predict collision with a preceding vehicle based on the distance and relative speed of the preceding vehicle. For example, the processor 170 may calculate the time to collision (TTC) with the preceding vehicle. If the TTC is less than a reference value, the processor 170 may predict occurrence of collision.

If collision with the preceding vehicle is predicted, the processor 170 may provide a height control signal for a front wheel suspension (S820).

For example, when collision with a preceding vehicle is predicted, the processor 170 may provide a control signal for lowering the front wheel suspension.

After collision with the following vehicle occurs, a nose up phenomenon may occur due to sudden application of the brake. In this instance, shock may be applied to the driver's vehicle 700 as the tail part of the preceding vehicle comes into the space below the driver's vehicle 700. Alternatively, the driver's vehicle 700 may flip over. At this time, the driver assistance apparatus 100 may operate, thereby preventing the nose up phenomenon and corresponding damages.

The processor 170 may predict collision with another vehicle approaching from the left side or the right side (S845). Herein, the vehicle approaching from the left side or the right side may be another vehicle traveling toward the left side or the right side of the driver's vehicle 700. The processor 170 may predict collision with another vehicle based on the distance and relative speed of the vehicle approaching from the left side or the right side. For example, the processor 170 may calculate the TTC with a vehicle approaching from the left side or the right side. If the TTC is less than or equal to a reference value, the processor 170 may predict occurrence of collision.

If collision with another vehicle approaching from the left side or the right side is predicted, the processor 170 may provide a suspension height control signal for the left wheels or the right wheels (S850).

For example, the processor 170 may detect the height of another vehicle approaching from the left side or the right side in a received image. The processor 170 may provide a left wheel or right wheel suspension height control signal in response to the height of the detected vehicle.

For example, when collision with another vehicle approaching from the left side is predicted, the processor 170 may provide a left wheel suspension height control signal such that the vehicle collides with an impact beam disposed on the left doors of the driver's vehicle 700.

For example, when collision with another vehicle approaching from the right side is predicted, the processor 170 may provide a right wheel suspension height control signal such that the vehicle collides with an impact beam disposed on the right doors of the driver's vehicle 700.

When collision with another vehicle approaching from the left side or the right side is predicted as above, collision with the impact beam may be induced to enhance safety of the passengers.

The left wheel or right wheel suspension height control signal may be provided to the suspension drive unit 759. The suspension drive unit 759 may control the suspension apparatus according to the provided control signal.

After collision with another vehicle approaching from the left side or the right side occurs, the processor 170 may determine, through the received image, whether overturning of the driver's vehicle 700 is sensed (S855). The processor 170 may determine overturning of the driver's vehicle 700 based on whether an object rotates to the left or right in the image. Herein, the expression "to the left or right" may indicate the width direction W.

For example, the rotation of the predetermined object to the left or right beyond a reference value is sensed, the processor 170 may determine that the driver's vehicle 700 is overturning.

If overturning of the driver's vehicle 700 is sensed, the processor 170 may provide a control signal for raising the suspension of the wheels on the opposite side of the impacted portion (S860).

Figure 9:
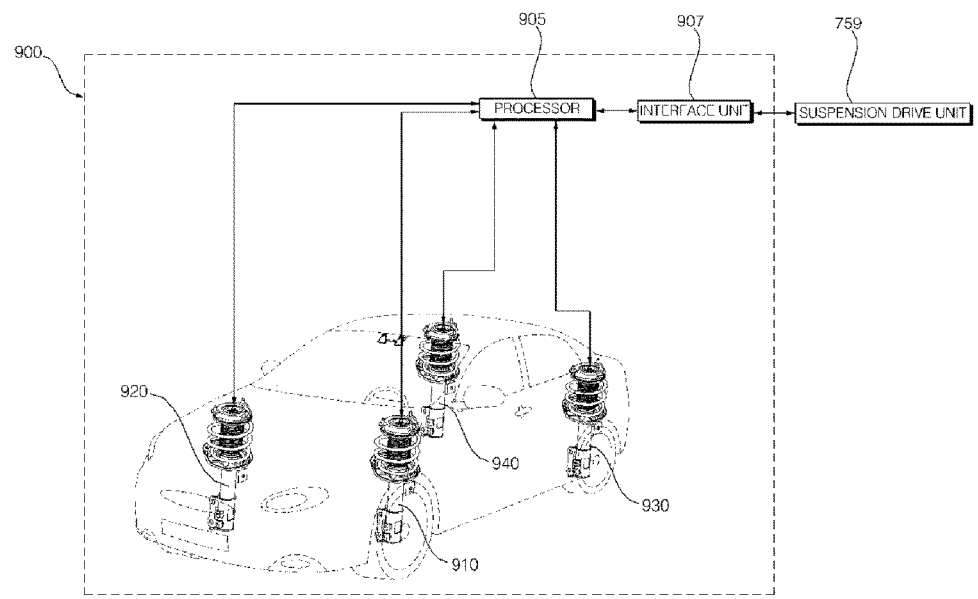
FIG. 9 is a view illustrating a suspension apparatus according to an embodiment of the present invention.

FIG. 9 is a view illustrating a suspension apparatus according to an embodiment of the present invention.

Referring to FIG. 9, a suspension apparatus 900 may include a first suspension 910 connected to the left front wheel, a second suspension 920 connected to the right front wheel, a third suspension 930 connected to the left rear wheel and a fourth suspension 940 connected to the right rear wheel.

Each of the suspensions 910, 920, 930 and 940 may include a spring, a shock absorber and a stabilizer.

Each of the suspensions 910, 920, 930 and 940 may be controlled by a processor 905. The processor 905 may be controlled by the suspension drive unit 759.

The suspension apparatus may include an interface unit. The interface unit may receive, from the driver assistance apparatus, a suspension height control signal for adjusting a portion of the driver's vehicle which is expected to be shocked according to collision between the driver's vehicle and an object detected in a vehicle front view image or surroundings-of-vehicle image.

The processor 905 may control the height of each of the suspensions 910, 920, 930 and 940 according to the received control signal.

The first suspension 910 and the second suspension 920 may be referred to as front wheel suspensions.

The third suspension 930 and the fourth suspension 940 may be referred to as rear wheel suspensions.

The first suspension 910 and the third suspension 930 may be referred to as left wheel suspensions.

The second suspension 920 and the fourth suspension 940 may be referred to as right wheel suspensions.

Figure 10:
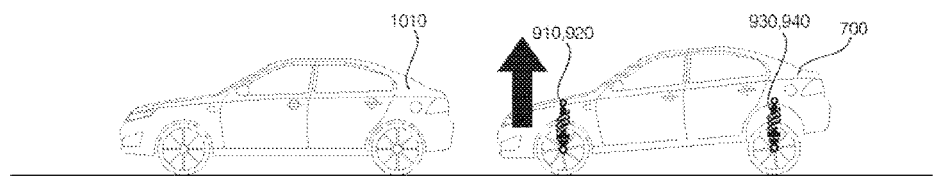
FIG. 10 illustrates operation of a driver assistance apparatus performed when collision with a preceding vehicle is expected according to an embodiment of the present invention.

FIG. 10 illustrates operation of a driver assistance apparatus performed when collision with a preceding vehicle is expected according to an embodiment of the present invention.

Referring to FIG. 10, the processor 170 may detect a preceding vehicle 1010 in a vehicle front view image or surroundings-of-vehicle image. The processor 170 may verify and track the preceding vehicle 1010.

The processor 170 may detect the distance and relative speed of the preceding vehicle 1010. For example, the processor 170 may track the preceding vehicle 1010 in the images, thereby converting variation in the size of the vehicle 1010 over time into the distance between the driver's vehicle 700 and the vehicle 1010. For example, the processor 170 may calculate the distance between the driver's vehicle 700 and the vehicle 1010 based on a disparity difference corresponding to the preceding vehicle 1010 in stereo images. For example, the processor 170 may calculate the distance between the driver's vehicle 700 and the vehicle 1010 based on the calculated TOF of the vehicle 1010.

The processor 170 may calculate a relative speed of the preceding vehicle 1010 by calculating the change in distance to the vehicle 1010 per unit time.

The processor 170 may predict collision with the preceding vehicle 1010. For example, the processor 170 may predict collision with the preceding vehicle 1010 based on the distance and relative speed of the preceding vehicle 1010. For example, the processor 170 may calculate the time to collision (TTC) with the preceding vehicle 1010. If the TTC is less than or equal to a reference value, the processor 170 may predict occurrence of collision.

When the vehicle is suddenly braked with collision with the preceding vehicle predicted, the processor 170 may provide a control signal for raising the front wheel suspensions 910 and 920. In this instance, the processor 170 may provide a control signal for raising the front wheel suspensions 910 and 920 such that the rear bumper of the preceding vehicle 1010 collides with the front bumper of the driver's vehicle 700.

The processor 170 may detect the position of the rear bumper of the preceding vehicle 1010 in images. The processor 170 may control the height of the suspensions 910 and 930 such that the detected rear bumper collides with the front bumper of the driver's vehicle 700.

By inducing collision between bumpers as above, damage may be minimized.

When the brake is suddenly applied, nose dive occurs. In this instance, the vehicle 700 may be subjected to shock as the front part of the vehicle 700 burrows into the space below the rear bumper of the preceding vehicle. If the driver assistance apparatus 100 is actuated, nose dive may be addressed and thus corresponding damage may be prevented.

The height control signal for the front wheel suspensions 910 and 920 may be provided to the suspension drive unit 759. The suspension drive unit 759 may control the suspension apparatus through the processor 905 according to the provided control signal.

After collision with a preceding vehicle 1010 occurs, the processor 170 may predict collision with a following vehicle. For example, the processor 170 may calculate the time to collision (TTC) with the following vehicle. If the TTC is less than a reference value, the processor 170 may predict occurrence of collision.

If collision with the following vehicle is predicted, the processor 170 may provide a height control signal for the rear wheel suspensions 930 and 940.

For example, the processor 170 may detect the position of the front bumper of the following vehicle. The processor 170 may provide a height control signal for the rear wheel suspensions 930 and 940 such that the front bumper of the detected vehicle collides with the rear bumper of the driver's vehicle 700.

By inducing collision between the bumpers as above, damage may be minimized.

Figure 11:
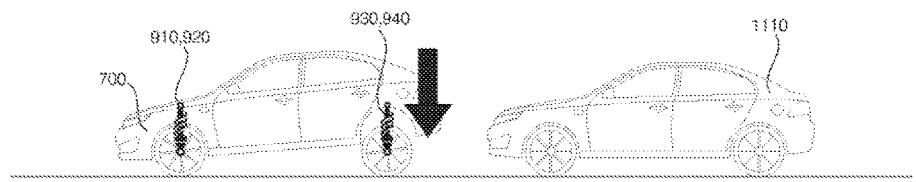
FIGS. 11 to 13 illustrate operation of a driver assistance apparatus performed when collision with a following vehicle is expected according to an embodiment of the present invention.
Figure 12:
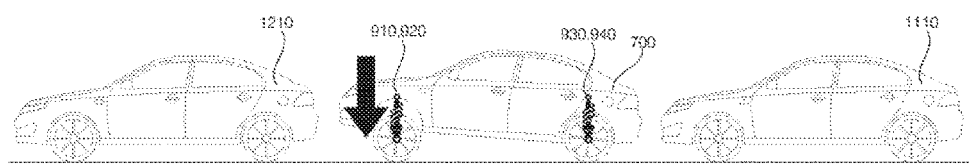
Figure 13:
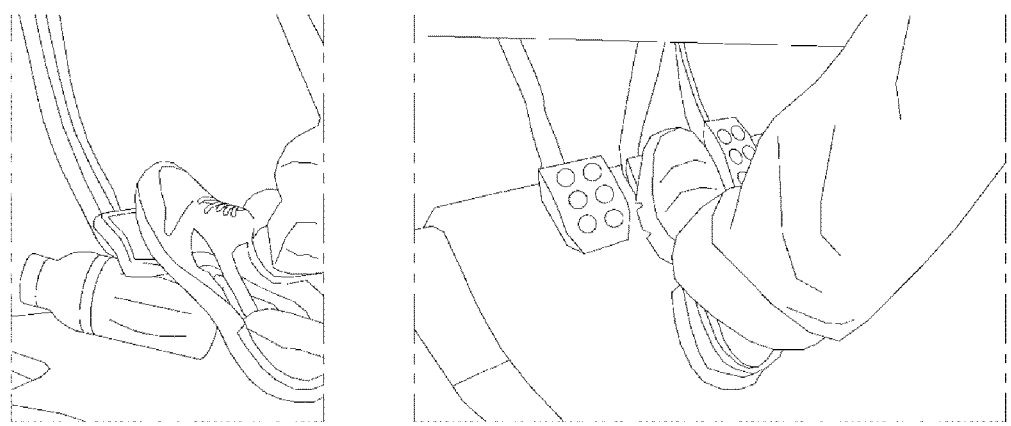

FIGS. 11 to 13 illustrate operation of a driver assistance apparatus performed when collision with a following vehicle is expected according to an embodiment of the present invention.

Referring to FIG. 11, the processor 170 may detect a following vehicle 1110 in a surroundings-of-vehicle image. The processor 170 may verify and track the following vehicle 1110.

The processor 170 may detect the distance and relative speed of the following vehicle 1110. For several, the processor 170 may track the following vehicle 1110 in images, thereby converting variation in the size of the vehicle 1110 over time into a distance between the driver's vehicle 700 and the vehicle 1110. For example, the processor 170 may calculate the distance between the driver's vehicle 700 and the vehicle 1110 based on a disparity difference corresponding to the following vehicle 1110 in stereo images. For example, the processor 170 may calculate the distance between the driver's vehicle 700 and the vehicle 1110 based on the calculated TOF of the vehicle 1110.

The processor 170 may predict collision with the following vehicle 1110. For example, the processor 170 may predict collision with the following vehicle 1110 based on the distance and relative speed of the following vehicle 1110. For example, the processor 170 may calculate the time to collision (TTC) with the following vehicle 1110. If the TTC is less than or equal to a reference value, the processor 170 may predict occurrence of collision.

When the brake is suddenly applied with collision with the following vehicle 1110 predicted, the processor 170 may provide a control signal for lowering the rear wheel suspensions 930 and 940. In this instance, the processor 170 may provide a control signal for lowering the rear wheel suspensions 930 and 940 such that the front bumper of the following vehicle 1110 collides with the rear bumper of the driver's vehicle 700.

The processor 170 may detect the position of the front bumper of the following vehicle 1110 in an image. The processor 170 may control the height of the suspensions 930 and 940 such that the detected front bumper collides with the rear bumper of the driver's vehicle 700.

By inducing collision between bumpers as above, damage may be minimized.

When the brake is suddenly applied, nose dive occurs. In this instance, shock may be applied to the driver's vehicle 700 as the following vehicle 1110 burrows into the space below the rear bumper of the driver's vehicle 700 with the rear part of this driver's vehicle lifted. In a certain case, the driver's vehicle 700 may flip over. If the driver assistance apparatus 100 operates, nose dive may be addressed and corresponding damage may be prevented.

The rear wheel suspension height control signal may be provided to the suspension drive unit 759. The suspension drive unit 759 may control the suspension apparatus according to the provided control signal.

Referring to FIG. 12, the processor 170 may detect a preceding vehicle 1210 in a vehicle front view image or surroundings-of-vehicle image. The processor 170 may verify and track the preceding vehicle 1210.

After collision with the following vehicle occurs, the processor 170 may predict collision with the preceding vehicle 1210.

When collision with the preceding vehicle 1210 is predicted, the processor 170 may provide a height control signal for the front wheel suspensions 910 and 920.

For example, when collision with the preceding vehicle 1210 is predicted, the processor 170 may provide a control signal for lowering the front wheel suspensions 910 and 920. In this instance, the processor 170 may provide a control signal for lowering the front wheel suspensions 910 and 920 such that the rear bumper of the vehicle 1210 collides with the front bumper of the driver's vehicle 700.

After collision with the following vehicle occurs, a nose up phenomenon may occur due to sudden application of the brake. In this instance, shock may be applied to the driver's vehicle 700 as the tail part of the preceding vehicle comes into the space below the driver's vehicle 700. Alternatively, the driver's vehicle 700 may flip over. At this time, the driver assistance apparatus 100 may operate, thereby preventing the nose up phenomenon and corresponding damages.

The front wheel suspension height control signal may be provided to the suspension drive unit 759. The suspension drive unit 759 may control the suspension apparatus according to the provided control signal.

Referring to FIG. 13, after collision with a following vehicle 1110 (see FIG. 11) occurs, the processor 170 may provide a control signal for performing full-braking. The control signal for performing full-braking may be provided to the brake drive unit 753. The brake drive unit 753 may control the brake apparatus according to the provided control signal. In this instance, the driver assistance apparatus 100 may prevent collision with a preceding vehicle 1210 (see FIG. 12) from occurring after collision with the following vehicle 1110 (see FIG. 11) occurs.

After collision with the following vehicle 1110 (see FIG. 11) occurs, the user may not take a proper action due to shock from the collision. For example, the user's foot may be displaced from the brake pedal due to foreign substances stuck to the brake pedal or shock. In this instance, the driver assistance apparatus 100 may operate as above to perform full-braking, thereby preventing a secondary accident.

Figure 14:
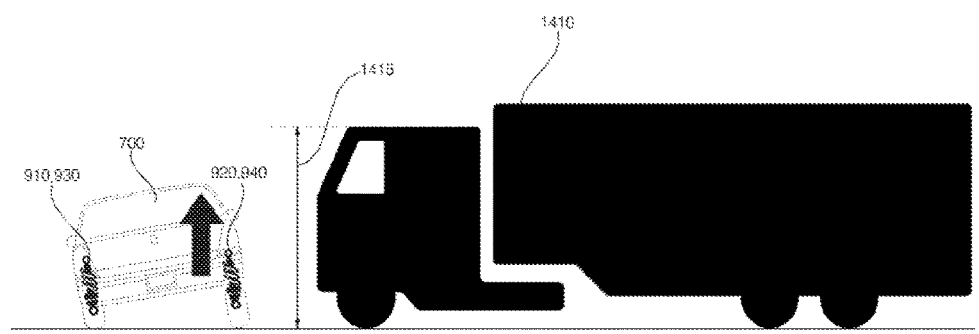
FIGS. 14 to 16B illustrate operation of a driver assistance apparatus performed when collision with another vehicle approaching from the left side or right side is predicted according to an embodiment of the present invention.
Figure 15:
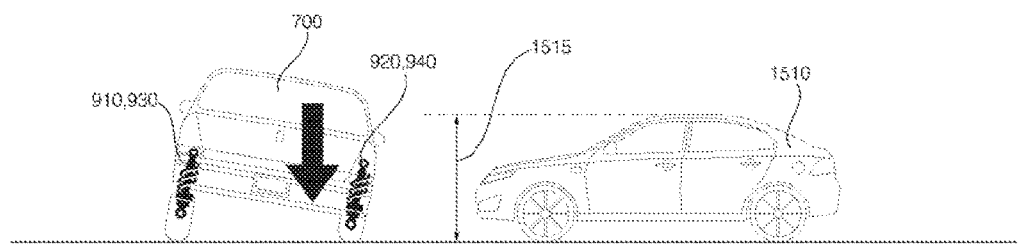

FIGS. 14 to 16 illustrate operation of a driver assistance apparatus performed when collision with another vehicle approaching from the left side or right side is predicted according to an embodiment of the present invention.

In FIGS. 14 to 16B, it is assumed that other vehicles 1410 and 1510 approach from the right side. The present invention also covers a case where other vehicles approach from the left side and other suspensions are applied.

Referring to FIGS. 14 and 15, the processor 170 may detect other vehicles 1410 and 1510 approaching from the right side in a surroundings-of-vehicle image. Herein, other vehicles approaching from the right side are vehicles traveling toward the driver's vehicle 700 from the right side of the driver's vehicle 700. The processor 170 may verify and track the vehicles 1410 and 1510.

The processor 170 may detect distances and relative speeds of other vehicles 1410 and 1510 approaching from the right side. For example, the processor 170 may track the vehicles 1410 and 1510, thereby converting variation in the size of the vehicles 1410 and 1510 over time into distances between the driver's vehicle 700 and the vehicles 1410 and 1510. For example, the processor 170 may calculate the distance between the driver's vehicle 700 and the vehicle 1110 based on the disparity difference corresponding to the vehicles 1410 and 1510 in the stereo images. For example, the processor 170 may calculate the distances between the driver's vehicle 700 and the vehicles 1410 and 1510 based on the calculated TOF of the vehicles 1410 and 1510.

The processor 170 may predict collision with the vehicles 1410 and 1510 approaching from the right side. Herein, the vehicles 1410 and 1510 approaching from the right side may be vehicles traveling toward the driver's vehicle 700 from the right side of the driver's vehicle 700. The processor 170 may predict collision with the vehicles 1410 and 1510 approaching from the right side based on the distances and relative speed of the vehicles 1410 and 1510. For example, the processor 170 may calculate the TTC with the vehicles 1410 1510 approaching from the right side. If the TTC is less than or equal to a reference value, the processor 170 may predict occurrence of collision.

If collision with the vehicles 1410 and 1510 approaching from the right side is predicted, the processor 170 may provide a height control signal for the right wheel suspensions 920 and 940

The processor 170 may detect heights 1415 and 1515 of other vehicles approaching from the right side in the received image. The processor 170 may provide a suspension height control signal for the left wheels or right wheels in response to the detected heights of other vehicles.

For example, as shown in FIG. 14, when the height 1415 of the vehicle 1410 approaching from the right side is larger than a reference value, the processor 170 may provide a control signal for raising the right wheel suspensions 920 and 940. Herein the reference value may correspond to the height of the driver's vehicle 700.

If the height of a suspension corresponding to the impacted portion is not properly controlled when side collision with the vehicle 1410 having a height larger than that of the driver's vehicle occurs, great damage may be caused to the driver's vehicle 700 as the driver's vehicle burrows into the space below the vehicle 1410. Thereby, life may be lost. In this instance, the driver assistance apparatus 100 may control the suspension as described above to induce appropriate collision to minimize damage.

For example, as shown in FIG. 15, when the height 1515 of another vehicle 1510 approaching from the right side is smaller than a reference value, the processor 170 may provide a control signal for lowering the right wheel suspensions 920 and 940. Herein, the reference value may correspond to the height of the driver's vehicle 700.

If the height of the suspension corresponding to the impacted portion is not properly controlled when side to collision with the vehicle 1510 having a height smaller than the height of the driver's vehicle 700, the driver's vehicle may flip over when collision with another vehicle occurs. Thereby, life may be lost. In this instance, the driver assistance apparatus 100 may control the suspension as described above to induce appropriate collision to minimize damage.

The processor 170 may provide a height control signal for the right wheel suspensions 920 and 940 such that another vehicle approaching from the right side collides with the impact beams disposed on the doors of the driver's vehicle 700.

Collision with the impact beams may be induced when collision with another vehicle approaching from the right side is predicted as above. Thereby, passenger safety may be enhanced.

The height control signal for the right wheel suspensions 920 and 940 may be provided to the suspension drive unit 759. The suspension drive unit 759 may control the suspension apparatus according to the provided control signal.

Figure 16A:
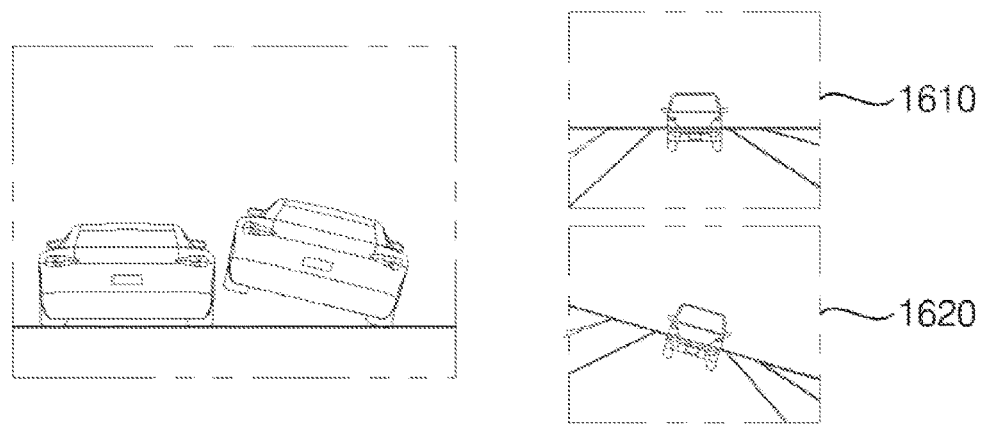

As illustrated in FIG. 16A, the vehicle 700 may flip over after collision with another vehicle 1510 approaching from the right side occurs.

When rotation in a predetermined direction is detected in an acquired image, the driver assistance apparatus 100 may predict an overturning accident. For example, when rotations 1610, 1620, 1630 and 1640 of the vehicle 700 about the overall-length direction L are detected according to rotation detected in the image, the processor 170 may determine that the vehicle has flipped over.

Figure 16B:
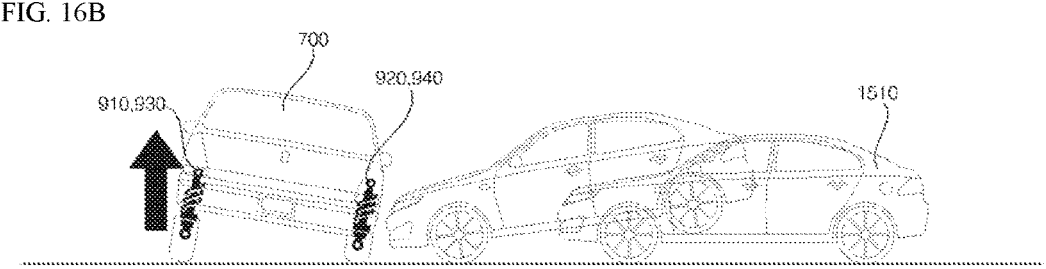

Referring to FIG. 16B, if rotation of a predetermined object about the overall-length L greater than or equal to a reference value is sensed in the image, the processor 170 may determine that the driver's vehicle 700 is overturning.

If overturning of the driver's vehicle 700 is sensed after collision with the vehicle 1510 approaching from the right side occurs, the processor 170 may provide a control signal for raising the wheel suspensions positioned on the opposite side of the impacted portion. According to an embodiment, the processor 170 may provide a control signal for raising the left wheel suspensions 910 and 930.

Figure 17:
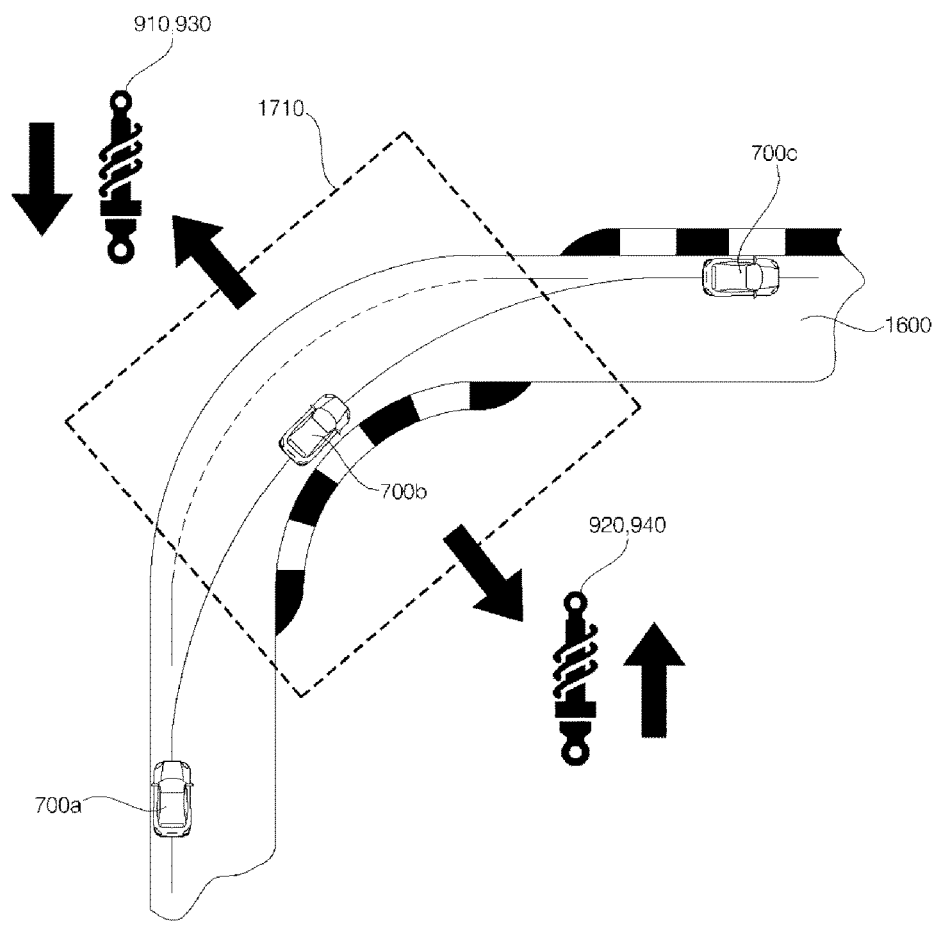
FIG. 17 is a view illustrating operation of a driver assistance apparatus performed when the vehicle travels along a curve according to an embodiment of the present invention.

FIG. 17 is a view illustrating operation of a driver assistance apparatus performed when the vehicle travels along a curve according to an embodiment of the present invention.

Hereinafter, description will be given with reference to FIG. 17 on the assumption that the road is curved rightward with respect to the forward direction of the vehicle. However, the present invention also covers a case where the road is curved leftward with respect to the forward direction of the vehicle and suspensions other than the suspensions used for the road curved rightward are controlled.

Referring to FIG. 17, the processor 170 may detect a curve 1710 to the right with respect to the forward direction of the vehicle in a vehicle front view image. According to an embodiment, the processor 170 may acquire information on the curve position in front of the vehicle from the navigation information.

The processor 170 may control the height of the left wheel suspensions or right wheel suspensions in response to the detected curve.

For example, the processor 170 may provide a control signal for raising the right wheel suspensions 920 and 940 in response to the detected curve. In addition, the processor 170 may provide a control signal for lowering the left wheel suspensions 910 and 930 in response to the detected curve.

By controlling the suspensions as above, understeer and oversteer may be prevented and a convenient ride may be provided to the user.

The processor 170 may receive travel speed information about the vehicle 700 from the sensing unit 760 through the interface unit 130. The processor 170 may provide a height control signal for the left wheel suspensions or right wheel suspensions in response to the curvature of the detected curve and the entrance speed on the curve.

For example, the processor 170 may adjust the control speed for raising or lowering the left wheel suspensions or right wheel suspensions based on the entrance speed. For example, the processor 170 may determine the control speed in proportion to the entrance speed. If the entrance speed is high, the processor 170 may provide a control signal such that the left wheel suspensions or right wheel suspensions are quickly raised or lowered. Alternatively, if the entrance speed is slow, the processor 170 may provide a control signal such that the left wheel suspensions or right wheel suspensions are slowly raised or lowered.

Figure 18:
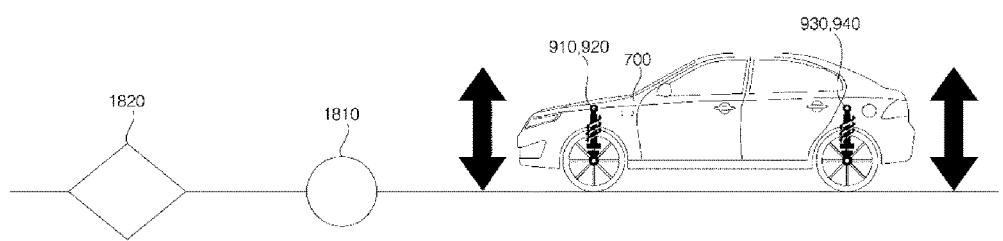
FIG. 18 is a view illustrating operation of a driver assistance apparatus depending on the condition of a road surface according to an embodiment of the present invention.

FIG. 18 is a view illustrating operation of a driver assistance apparatus depending on the condition of a road surface according to an embodiment of the present invention.

Referring to FIG. 18, the processor 170 may detect a road surface in a vehicle front view image or surroundings-of-vehicle image. The processor 170 may generate road surface condition information by analyzing the detected road surface. The processor 170 may provide a height control signal for the suspensions based on the road surface condition information.

For example, the processor 170 may detect the uneven portions 1810 and 1820 of the road surface in a vehicle front view image or surroundings-of-vehicle image. Herein, the bumps 1810 and 1820 may include obstacles (e.g. gravel, stone, rock, a load having fallen from another vehicle, etc.) protruding from the road surface or potholes and sinkholes in the road surface.

The processor 170 may provide a height control signal for the suspension of a wheel passing over an uneven portion based on the detected uneven portions of the road surface. The suspensions 910, 920, 930 and 940 may be individually controlled. Accordingly, by controlling the suspensions of the wheels at the moment the wheels pass over an uneven portion, convenient ride may be provided to the user.

Figure 19:
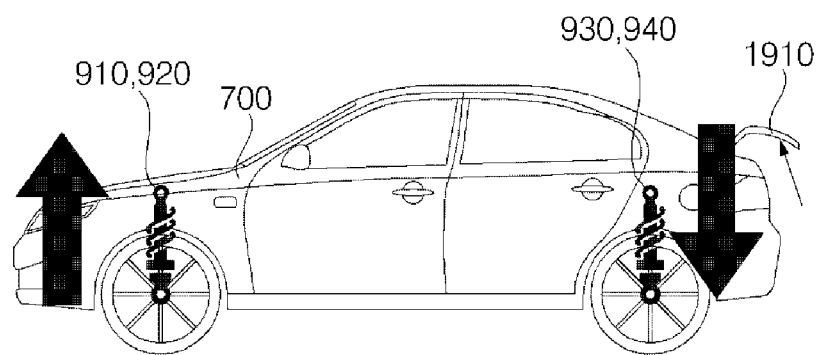
FIG. 19 is a view illustrating operation of a driver assistance apparatus performed when the trunk is open according to an embodiment of the present invention.

FIG. 19 is a view illustrating operation of a driver assistance apparatus performed when the trunk is open according to an embodiment of the present invention.

Referring to FIG. 19, the processor 170 may receive trunk opening information from the controller 770 or the sensing unit 760 through the interface unit 130.

For example, when an input for opening the trunk is received from the user through the user input unit 724, the processor 170 may receive the input from the user input unit 724 or the controller 770 through the interface unit 130.

For example, if a trunk opening sensor is included in the sensing unit 760, the processor 170 may receive the trunk opening information from the sensing unit 760.

When the trunk is opened, the processor 170 may provide a control signal for lowering the rear wheel suspensions.

By lowering the rear wheel suspensions when the trunk is opened, the user may easily take objects out of the trunk.

As is apparent from the above description, the present invention has one or more of the following effects.

First, when collision with an object is expected, collision between a part to minimize damages and the object may be induced.

Second, when collision with a preceding vehicle is expected, the suspension may be controlled to minimize damages to the vehicle of a user and to protect the user as safely as possible.

Third, when collision with a following vehicle is expected, the suspension may be controlled to minimize damage to the vehicle of a user, to protect the user as safely as possible and to prevent secondary collision.

Fourth, when collision with a vehicle crashing into one side of the vehicle of a user is expected, the suspension may be controlled to protect the user as safely as possible and to prevent the vehicle from flipping over.

Effects of the present invention are not limited to the aforementioned effects, and other effects of the present invention which are not mentioned above will become apparent to those having ordinary skill in the art from the claims.

The present invention described above may be implemented as computer-readable code on a medium on which a program is recorded. The computer-readable medium includes all kinds of recording devices in which data readable by a computer system can be stored. Examples of the computer-readable medium include a hard disk drive (HDD), solid state disk (SSD), silicon disk drive (SDD), ROM, RAM, CD-ROM, magnetic tape, floppy disk, and optical data storage. Alternatively, the invention may be implemented in the form of a carrier wave (e.g., transmission over the Internet). In addition, the computer may include the processor 170 or the controller 770. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A driver assistance apparatus comprising:
    a camera configured to acquire an image outside of a driver's vehicle, the image being a vehicle front view image, a vehicle rear view image or a vehicle side view image; and
    a processor configured to
        detect an object in the image,
        determine whether a collision between the driver's vehicle and the object is expected, and
        provide a height control signal for a suspension of the driver's vehicle to adjust a height of an expected impacted portion of the driver's vehicle,
    wherein the object includes a following vehicle positioned behind the driver's vehicle,
    wherein the processor is configured to:
        provide the height control signal for lowering a rear wheel suspension of the driver's vehicle when sudden braking is performed when a collision between the driver's vehicle and the following vehicle is expected,
        provide a control signal for performing full-braking after a collision between the driver's vehicle and the following vehicle, and
        provide a height control signal for lowering a front wheel suspension of the driver's vehicle when a collision between the driver's vehicle and a preceding vehicle positioned in front of the driver's vehicle is expected after a collision between the driver's vehicle and the following vehicle, and wherein the processor is further configured to:
  determine an overturning situation based on whether rotation of the object about an overall-length direction greater than or equal to a reference value is sensed in the image, and
  provide, based on the determination of the overturning situation, the height control signal for raising left wheel suspensions or right wheel suspensions.

2. The driver assistance apparatus according to claim 1, wherein the image is the vehicle front view image and the object is a preceding vehicle positioned in front of the driver's vehicle, and
  wherein the processor is configured to provide the height control signal to raise a front wheel suspension of the driver's vehicle when sudden braking is performed when a collision between the driver's vehicle and the preceding vehicle is expected.

3. The driver assistance apparatus according to claim 2, wherein the processor is configured to provide the height control signal for raising the front wheel suspension of the driver's vehicle such that a bumper of the preceding vehicle collides with a bumper of the driver's vehicle.

4. The driver assistance apparatus according to claim 1, wherein the processor is configured to provide the height control signal for lowering the rear wheel suspension of the driver's vehicle such that a bumper of the following vehicle collides with a bumper of the driver's vehicle.

5. The driver assistance apparatus according to claim 1, wherein the image is the vehicle side view image and the object is an other vehicle approaching from a left side or a right side of the driver's vehicle, and
  wherein the processor is configured to provide the height control signal to a left wheel suspension or a right wheel suspension of the driver's vehicle when a collision between the driver's vehicle and the other vehicle is expected.

6. The driver assistance apparatus according to claim 5, wherein the processor is configured to provide the height control signal for the left wheel suspension or the right wheel suspension in response to a height of the other vehicle.

7. The driver assistance apparatus according to claim 5, wherein the processor is configured to provide the height control signal for the left wheel suspension or the right wheel suspension such that the other vehicle collides with an impact beam disposed on a door of the driver's vehicle.

8. The driver assistance apparatus according to claim 1, further comprising:
  an interface unit configured to perform communication with a power source drive unit,
  wherein the processor is configured to provide a control signal to the power source drive unit such that power is not delivered to the driver's vehicle when a collision with the detected object is expected.

9. A vehicle comprising:
  a driver assistance apparatus comprising:
    a camera configured to acquire an image outside of the vehicle; and
    a first processor configured to
      detect an object in the image,
      determine whether a collision between the vehicle and the object is expected, and
      provide a height control signal for a suspension of the vehicle to adjust a height of an expected impacted portion of the vehicle; and
  a suspension apparatus comprising:
    an interface unit configured to receive the height control signal; and
    a second processor configured to control a height of the suspension according to the height control signal,
  wherein the object includes a following vehicle positioned behind the driver's vehicle,
  wherein the first processor is configured to:
    provide the height control signal for lowering a rear wheel suspension of the driver's vehicle when sudden braking is performed when a collision between the driver's vehicle and the following vehicle is expected,
    provide a control signal for performing full-braking after a collision between the driver's vehicle and the following vehicle, and
    provide a height control signal for lowering a front wheel suspension of the driver's vehicle when a collision between the driver's vehicle and a preceding vehicle positioned in front of the driver's vehicle is expected after a collision between the driver's vehicle and the following vehicle, and
  wherein the first processor is further configured to:
    determine an overturning situation based on whether rotation of the object about an overall-length direction greater than or equal to a reference value is sensed in the image, and
    provide, based on the determination of the overturning situation, the height control signal for raising left wheel suspensions or right wheel suspensions.

10. The vehicle according to claim 9, wherein the image is a vehicle front view image and the object is positioned in front of the vehicle, and
  wherein the first processor is configured to provide the height control signal to raise a front wheel suspension of the vehicle when sudden braking is performed when a collision between the vehicle and the object is expected.

11. The vehicle according to claim 9, wherein the image is a vehicle rear view image and the object is positioned behind the vehicle, and
  wherein the first processor is configured to provide the height control signal to adjust a rear wheel suspension of the vehicle when a collision between the vehicle and the object is expected.

12. The vehicle according to claim 9, wherein the image is a vehicle side view image and the object is positioned at a left side or a right side of the vehicle, and
  wherein the first processor is configured to provide the height control signal to adjust a left wheel suspension or a right wheel suspension of the vehicle when a collision between the vehicle and the object is expected.

13. A method of controlling a suspension of a vehicle, the method comprising:
  acquiring, by at least one camera, an image outside of a driver's vehicle, the image being a vehicle front view image, a vehicle rear view image or a vehicle side view image;
  detecting, by at least one processor, an object in the image, wherein the object includes a following vehicle positioned behind the driver's vehicle;
  determining, by the processor, whether a collision between the driver's vehicle and the object is expected;
  providing, by the processor, a height control signal for a suspension of the driver's vehicle to adjust a height of an expected impacted portion of the driver's vehicle;

providing, by the processor, the height control signal for lowering a rear wheel suspension of the driver's vehicle when sudden braking is performed when a collision between the driver's vehicle and the following vehicle is expected;

providing, by the processor, a control signal for performing full-braking after a collision between the driver's vehicle and the following vehicle;

providing, by the processor, a height control signal for lowering a front wheel suspension of the driver's vehicle when a collision between the driver's vehicle and a preceding vehicle positioned in front of the driver's vehicle is expected after a collision between the driver's vehicle and the following vehicle;

determining an overturning situation based on whether rotation of the object about an overall-length direction greater than or equal to a reference value is sensed in the image; and providing, based on the determination of the overturning situation, the height control signal for raising left wheel suspensions or right wheel suspensions.

14. The method according to claim 13, wherein the image is the vehicle front view image and the object is a preceding vehicle positioned in front of the driver's vehicle, and wherein the method further comprises providing the height control signal to raise a front wheel suspension of the driver's vehicle when sudden braking is performed when a collision between the driver's vehicle and the preceding vehicle is expected.

15. The method according to claim 13, wherein the image is the vehicle rear view image and the object is a following vehicle positioned behind the driver's vehicle, and wherein the method further comprises providing the height control signal to lower a rear wheel suspension of the driver's vehicle when a collision between the driver's vehicle and the following vehicle is expected.

* * * * *